US011006589B2

(12) United States Patent
Marsano et al.

(10) Patent No.: US 11,006,589 B2
(45) Date of Patent: May 18, 2021

(54) WEATHER OVERRIDE IRRIGATION CONTROL SYSTEMS AND METHODS

(71) Applicant: Rain Bird Corporation, Azusa, CA (US)

(72) Inventors: Jorge A. Marsano, Tucson, AZ (US); Joseph G. Porrazzo, Sahuarita, AZ (US); John E. Price, Tucson, AZ (US); Hari Reddy, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 110 days.

(21) Appl. No.: 16/235,853

(22) Filed: Dec. 28, 2018

(65) Prior Publication Data

US 2019/0200547 A1 Jul. 4, 2019

Related U.S. Application Data

(60) Provisional application No. 62/611,981, filed on Dec. 29, 2017.

(51) Int. Cl.
*A01G 25/16* (2006.01)
*G01W 1/02* (2006.01)

(52) U.S. Cl.
CPC .............. *A01G 25/165* (2013.01); *G01W 1/02* (2013.01); *Y10T 137/1866* (2015.04)

(58) Field of Classification Search
CPC ... Y10T 137/1866; A01G 25/165; G01W 1/02
USPC ...................................... 73/170.23
See application file for complete search history.

(56) References Cited

U.S. PATENT DOCUMENTS

| 2,202,452 | A | * | 5/1940 | Hildabrand | ............. | G01W 1/14 |
|  |  |  |  |  |  | 73/170.23 |
| D127,348 | S |  | 5/1941 | Gayda |  |  |
| D153,568 | S |  | 4/1949 | Wagner |  |  |
| 2,688,056 | A |  | 8/1954 | Kettering |  |  |
| 2,776,860 | A |  | 1/1957 | Griffis |  |  |
| 2,991,938 | A |  | 7/1961 | Norcross |  |  |
| 3,127,769 | A |  | 4/1964 | Stucky |  |  |

(Continued)

FOREIGN PATENT DOCUMENTS

| DE | 237456 A3 | 7/1986 |
| EP | 2883034 B1 | 6/2015 |

(Continued)

OTHER PUBLICATIONS

US 8,224,494 B2, 07/2012, Anderson (withdrawn)
(Continued)

*Primary Examiner* — Marina A Tietjen
*Assistant Examiner* — Frederick D Soski
(74) *Attorney, Agent, or Firm* — Fitch, Even, Tabin & Flannery LLP

(57) ABSTRACT

In some embodiments, provide an irrigation sensor system, comprising: a rain funnel comprising an upper opening and at least one wall tapering from the upper opening to a lower aperture; and a tipping bucket positioned to receive water falling from the lower aperture while the tipping bucket is positioned such that a central longitudinal axis of the tipping bucket is not aligned with an axis extending through the lower aperture of the funnel.

12 Claims, 19 Drawing Sheets

(56) References Cited

U.S. PATENT DOCUMENTS

| | | | | |
|---|---|---|---|---|
| 3,243,999 | A * | 4/1966 | Barker | G01W 1/14 73/170.23 |
| 3,297,254 | A | 1/1967 | Coffman | |
| 3,309,474 | A | 3/1967 | Heinrich | |
| 3,485,096 | A | 12/1969 | Miller | |
| 3,675,672 | A * | 7/1972 | Freeman | E02B 13/02 137/804 |
| 3,705,533 | A * | 12/1972 | Kahl | G01W 1/14 73/170.23 |
| 3,721,122 | A | 3/1973 | Lucas | |
| 3,808,385 | A | 4/1974 | Klinefelter | |
| 3,943,762 | A * | 3/1976 | Baer | G01W 1/14 73/170.23 |
| 4,012,673 | A | 3/1977 | Saarem | |
| 4,022,384 | A | 5/1977 | Wallis | |
| 4,064,507 | A | 12/1977 | Schmitz | |
| 4,209,131 | A | 6/1980 | Barash | |
| 4,264,902 | A | 4/1981 | Miller | |
| 4,313,042 | A | 1/1982 | Ehrhart | |
| 4,394,603 | A | 7/1983 | Widmayer | |
| D270,272 | S | 8/1983 | Steele | |
| 4,396,149 | A | 8/1983 | Hirsch | |
| D276,039 | S | 10/1984 | Tanaka | |
| 4,613,764 | A | 9/1986 | Lobato | |
| 4,644,786 | A * | 2/1987 | Jacobsen | G01W 1/14 73/170.23 |
| 4,655,076 | A | 4/1987 | Weihe | |
| 4,684,920 | A | 8/1987 | Reiter | |
| 4,701,613 | A | 10/1987 | Watanabe | |
| 4,718,185 | A | 1/1988 | Conlin | |
| 4,760,547 | A | 7/1988 | Duxbury | |
| 4,817,875 | A | 4/1989 | Karmeli | |
| 4,862,701 | A | 9/1989 | Small | |
| 4,916,642 | A | 4/1990 | Kaiser | |
| 4,919,165 | A | 4/1990 | Lloyd | |
| 4,921,001 | A | 5/1990 | Pittsinger | |
| 4,922,433 | A | 5/1990 | Mark | |
| 4,987,296 | A | 1/1991 | Kajioka | |
| D316,875 | S | 5/1991 | Momot | |
| 5,060,859 | A | 10/1991 | Bancroft | |
| 5,087,886 | A | 2/1992 | Mann | |
| 5,101,083 | A | 3/1992 | Tyler | |
| 5,104,045 | A | 4/1992 | Kah | |
| 5,109,482 | A | 4/1992 | Bohrman | |
| D328,763 | S | 8/1992 | Laviana | |
| 5,193,570 | A | 3/1993 | Mott | |
| 5,207,380 | A | 5/1993 | Harryman | |
| 5,299,742 | A | 4/1994 | Han | |
| 5,321,578 | A | 6/1994 | Morrison | |
| 5,329,081 | A | 7/1994 | Jones | |
| 5,333,785 | A | 8/1994 | Dodds | |
| 5,355,122 | A | 10/1994 | Erickson | |
| 5,367,627 | A | 11/1994 | Johnson | |
| 5,375,617 | A | 12/1994 | Young | |
| 5,381,331 | A | 1/1995 | Mock | |
| 5,394,748 | A | 3/1995 | McCarthy | |
| 5,401,262 | A | 3/1995 | Karwoski | |
| 5,424,649 | A | 6/1995 | Gluck | |
| 5,444,611 | A | 8/1995 | Woytowitz | |
| 5,465,904 | A | 11/1995 | Vaello | |
| 5,499,024 | A | 3/1996 | Germanton | |
| D368,493 | S | 4/1996 | Boes | |
| 5,505,082 | A * | 4/1996 | Cushman | G01W 1/14 73/170.21 |
| 5,526,982 | A | 6/1996 | McKenzie | |
| 5,554,809 | A | 9/1996 | Tobita | |
| 5,568,385 | A | 10/1996 | Shelton | |
| 5,598,977 | A | 2/1997 | Lemme | |
| 5,640,176 | A | 6/1997 | Mundt | |
| D388,424 | S | 12/1997 | Demuro | |
| 5,696,671 | A | 12/1997 | Oliver | |
| 5,727,950 | A | 3/1998 | Cook | |
| 5,740,038 | A | 4/1998 | Hergert | |
| 5,813,606 | A | 9/1998 | Ziff | |
| D399,837 | S | 10/1998 | Garguilo | |
| 5,818,734 | A | 10/1998 | Albright | |
| 5,821,864 | A | 10/1998 | Knop | |
| D400,522 | S | 11/1998 | Waldner | |
| 5,836,339 | A | 11/1998 | Klever | |
| 5,839,660 | A | 11/1998 | Morgenstern | |
| D402,645 | S | 12/1998 | Garguilo | |
| 5,853,122 | A | 12/1998 | Caprio | |
| 5,870,302 | A | 2/1999 | Oliver | |
| 5,886,697 | A | 3/1999 | Naughton | |
| D407,656 | S | 4/1999 | Klever | |
| 5,898,110 | A * | 4/1999 | Hagstrom | G01W 1/14 73/1.16 |
| 5,905,480 | A | 5/1999 | Palalau | |
| 5,918,276 | A | 6/1999 | Grindle | |
| 5,921,280 | A | 7/1999 | Ericksen | |
| 5,925,986 | A | 7/1999 | Moisin | |
| D415,134 | S | 10/1999 | Culp | |
| 6,005,517 | A | 12/1999 | Friedrichs | |
| 6,016,971 | A | 1/2000 | Welch | |
| 6,038,920 | A | 3/2000 | Gilbert | |
| 6,076,740 | A | 6/2000 | Townsend | |
| 6,088,621 | A | 7/2000 | Woytowitz | |
| 6,126,093 | A | 10/2000 | Grether | |
| 6,145,755 | A | 11/2000 | Feltz | |
| D437,859 | S | 2/2001 | Alvarez | |
| 6,210,383 | B1 | 4/2001 | Want | |
| D441,764 | S | 5/2001 | Minagawa | |
| 6,260,765 | B1 | 7/2001 | Natale | |
| 6,300,728 | B1 | 10/2001 | Blackburn | |
| 6,314,340 | B1 | 11/2001 | Mecham | |
| 6,369,712 | B2 | 4/2002 | Letkomiller | |
| 6,401,530 | B1 | 6/2002 | Roman | |
| 6,427,535 | B1 | 8/2002 | Sakai | |
| 6,452,499 | B1 | 9/2002 | Runge | |
| 6,453,215 | B1 * | 9/2002 | Lavoie | A01G 25/16 137/624.11 |
| 6,453,216 | B1 * | 9/2002 | McCabe | A01G 25/16 700/284 |
| D466,519 | S | 12/2002 | Shim | |
| D469,107 | S | 1/2003 | Miller | |
| D473,239 | S | 4/2003 | Cockerill | |
| D473,240 | S | 4/2003 | Cockerill | |
| 6,570,109 | B2 | 5/2003 | Klinefelter | |
| 6,585,168 | B1 | 7/2003 | Caprio | |
| 6,714,134 | B2 | 3/2004 | Addink | |
| 6,721,630 | B1 | 4/2004 | Woytowitz | |
| 6,782,310 | B2 | 8/2004 | Bailey | |
| 6,782,311 | B2 | 8/2004 | Barlow | |
| D496,667 | S | 9/2004 | Hoglund | |
| 6,823,239 | B2 | 11/2004 | Sieminski | |
| D503,178 | S | 3/2005 | Choi | |
| 6,892,114 | B1 | 5/2005 | Addink | |
| 6,895,987 | B2 | 5/2005 | Addink | |
| 6,977,351 | B1 | 12/2005 | Woytowitz | |
| 7,003,357 | B1 | 2/2006 | Kreikemeier | |
| 7,010,394 | B1 | 3/2006 | Runge | |
| 7,010,395 | B1 | 3/2006 | Goldberg | |
| 7,050,887 | B2 | 5/2006 | Alvarez | |
| 7,058,478 | B2 | 6/2006 | Alexanian | |
| D526,657 | S | 8/2006 | Matsumoto | |
| 7,096,094 | B2 | 8/2006 | Addink | |
| 7,111,179 | B1 | 9/2006 | Girson | |
| 7,114,388 | B1 * | 10/2006 | French | G01W 1/00 73/170.16 |
| 7,123,993 | B1 | 10/2006 | Freeman | |
| 7,177,728 | B2 | 2/2007 | Gardner | |
| 7,198,393 | B2 | 4/2007 | Tubidis | |
| 7,216,145 | B2 | 5/2007 | Collings, III | |
| 7,216,659 | B2 | 5/2007 | Caamano | |
| 7,229,026 | B2 | 6/2007 | Evelyn-Veere | |
| 7,236,249 | B1 | 6/2007 | Michenfelder | |
| 7,241,974 | B2 | 7/2007 | Reusche | |
| 7,243,459 | B2 | 7/2007 | Kaprielian | |
| 7,245,991 | B1 | 7/2007 | Woytowitz | |
| 7,249,502 | B2 | 7/2007 | Luukkala | |
| 7,266,428 | B2 | 9/2007 | Alexanian | |
| 7,280,892 | B2 | 10/2007 | Bavel | |
| 7,286,904 | B2 | 10/2007 | Graham | |

(56) References Cited

U.S. PATENT DOCUMENTS

| | | |
|---|---|---|
| 7,339,957 B2 | 3/2008 | Hitt |
| 7,363,113 B2 | 4/2008 | Runge |
| 7,386,289 B2 | 6/2008 | Weller |
| 7,403,840 B2 | 7/2008 | Moore |
| 7,412,303 B1 | 8/2008 | Porter |
| D587,278 S | 2/2009 | Sans |
| 7,494,070 B2 | 2/2009 | Collins |
| 7,516,002 B2 | 4/2009 | Veerasamy |
| 7,526,365 B1 | 4/2009 | Frerich |
| D592,222 S | 5/2009 | Chaudhri |
| 7,532,954 B2 | 5/2009 | Evelyn-Veere |
| 7,540,186 B2 | 6/2009 | Jeong |
| 7,552,632 B2 | 6/2009 | Runge |
| D599,816 S | 9/2009 | Kaczmarek |
| D600,704 S | 9/2009 | LaManna |
| D600,713 S | 9/2009 | LaManna |
| D600,714 S | 9/2009 | LaManna |
| 7,590,471 B2 | 9/2009 | Jacobsen |
| 7,596,429 B2 | 9/2009 | Cardinal |
| D601,578 S | 10/2009 | Poulet |
| D602,496 S | 10/2009 | Takano |
| D602,944 S | 10/2009 | Barkhouse |
| 7,613,546 B2 | 11/2009 | Nelson |
| D608,789 S | 1/2010 | Kaczmarek |
| 7,654,684 B1 | 2/2010 | Wight |
| 7,687,028 B1 * | 3/2010 | Coplen, II ............... G01N 1/18 422/67 |
| D623,194 S | 9/2010 | Cook |
| 7,805,221 B2 | 9/2010 | Nickerson |
| D625,622 S | 10/2010 | Mallela |
| 7,809,475 B2 | 10/2010 | Kaprielian |
| 7,814,197 B2 | 10/2010 | Collings, III |
| 7,844,368 B2 | 11/2010 | Alexanian |
| 7,853,363 B1 | 12/2010 | Porter |
| 7,877,168 B1 | 1/2011 | Porter |
| 7,912,588 B2 | 3/2011 | Runge |
| 7,930,069 B2 | 4/2011 | Savelle |
| 7,937,187 B2 | 5/2011 | Kaprielian |
| 7,949,433 B2 | 5/2011 | Hern |
| 7,962,245 B2 | 6/2011 | Runge |
| 8,028,572 B2 | 10/2011 | Matsuda |
| 8,104,993 B2 | 1/2012 | Hitt |
| 8,160,750 B2 | 4/2012 | Weiler |
| 8,209,061 B2 | 6/2012 | Palmer |
| 8,209,124 B2 | 6/2012 | Dannevik |
| 8,215,570 B2 | 7/2012 | Hitt |
| 8,271,198 B2 | 9/2012 | Teder |
| 8,301,309 B1 | 10/2012 | Woytoxitz |
| 8,321,365 B2 | 11/2012 | Anderson |
| 8,437,879 B2 | 5/2013 | Anderson |
| 8,494,774 B2 | 7/2013 | Pasken |
| 8,538,592 B2 | 9/2013 | Alexanian |
| 8,548,632 B1 | 10/2013 | Porter |
| 8,548,669 B2 | 10/2013 | Naylor |
| 8,554,380 B2 | 10/2013 | Nourian |
| 8,573,049 B1 | 11/2013 | Ware |
| 8,606,415 B1 | 12/2013 | Woytowitz |
| 8,620,480 B2 | 12/2013 | Alexanian |
| 8,635,024 B2 | 1/2014 | Brillhart |
| 8,660,705 B2 | 2/2014 | Woytowitz |
| 8,874,275 B2 | 3/2014 | Alexanian |
| 8,924,032 B2 | 3/2014 | Woytowitz |
| 8,714,007 B2 | 5/2014 | Cullen |
| 8,733,165 B2 | 5/2014 | Hern |
| 8,744,773 B2 | 6/2014 | Woytowitz |
| 8,862,275 B2 | 10/2014 | Runge |
| 8,948,921 B2 | 2/2015 | Halahan |
| 8,991,108 B1 | 3/2015 | Zamrzla |
| 9,032,998 B2 | 5/2015 | O'Brien |
| 9,053,585 B2 | 6/2015 | Naylor |
| 9,131,642 B2 | 9/2015 | Groeneveld |
| 9,144,204 B2 | 9/2015 | Redmond |
| 9,244,192 B2 | 1/2016 | Cullen |
| 9,244,449 B2 | 1/2016 | Tennyson |
| 9,247,321 B2 | 1/2016 | Pryor |
| 9,301,460 B2 | 4/2016 | Runge |
| 9,301,461 B2 | 4/2016 | Woytowitz |
| 9,414,552 B2 | 8/2016 | Halahan |
| 9,439,367 B2 | 9/2016 | Abhyanker |
| 9,474,216 B1 | 10/2016 | Reiss |
| 9,500,770 B2 | 11/2016 | Hern |
| 9,519,078 B2 | 12/2016 | Lanza |
| 9,633,532 B1 | 4/2017 | Larrison |
| 9,655,311 B1 | 5/2017 | Bell |
| 9,696,459 B1 | 7/2017 | Murphy |
| 9,756,844 B2 | 9/2017 | Groeneveld |
| 9,763,393 B2 | 9/2017 | Parsons |
| 9,781,887 B2 | 10/2017 | Woytowitz |
| 10,123,493 B2 | 11/2018 | Runge |
| 10,206,341 B2 * | 2/2019 | Micu ...................... G05B 15/02 |
| 10,206,342 B2 | 2/2019 | Redmond |
| 10,345,487 B2 | 7/2019 | Hern |
| 10,444,769 B2 | 10/2019 | Weiler |
| 10,531,617 B2 * | 1/2020 | Verma .................. A01G 25/167 |
| 2001/0049563 A1 | 12/2001 | Addink |
| 2002/0026284 A1 | 2/2002 | Brown |
| 2002/0029111 A1 | 3/2002 | Peek |
| 2002/0060631 A1 | 5/2002 | Runge |
| 2002/0165700 A1 * | 11/2002 | Zur ...................... A01G 25/165 702/188 |
| 2003/0079974 A1 | 5/2003 | Klinefelter |
| 2003/0085929 A1 | 5/2003 | Huber |
| 2003/0117321 A1 | 6/2003 | Furse |
| 2004/0011880 A1 | 1/2004 | Addink |
| 2004/0039471 A1 | 2/2004 | Moore |
| 2004/0100394 A1 | 5/2004 | Hitt |
| 2004/0113106 A1 | 6/2004 | Pyun |
| 2004/0140903 A1 | 7/2004 | Buhler |
| 2004/0206395 A1 | 10/2004 | Addink |
| 2004/0217189 A1 | 11/2004 | Regli |
| 2004/0244833 A1 | 12/2004 | Buhler |
| 2005/0046372 A1 | 3/2005 | Heo |
| 2005/0082382 A1 | 4/2005 | Evelyn-Veere |
| 2005/0107924 A1 | 5/2005 | Bailey |
| 2005/0171646 A1 | 8/2005 | Miller |
| 2005/0192710 A1 | 9/2005 | Thornton |
| 2005/0199842 A1 | 9/2005 | Parsons |
| 2005/0206530 A1 | 9/2005 | Cumming |
| 2005/0216130 A1 | 9/2005 | Clark |
| 2006/0030971 A1 | 2/2006 | Nelson |
| 2006/0049271 A1 | 3/2006 | Hitt |
| 2006/0100747 A1 | 5/2006 | Runge |
| 2006/0118200 A1 | 6/2006 | Nies |
| 2006/0122736 A1 | 6/2006 | Alexanian |
| 2006/0155489 A1 | 7/2006 | Addink |
| 2006/0161309 A1 | 7/2006 | Moore |
| 2006/0172714 A1 | 8/2006 | Weller |
| 2006/0184285 A1 | 8/2006 | Evelyn-Veere |
| 2006/0202051 A1 | 9/2006 | Parsons |
| 2006/0293797 A1 | 12/2006 | Weiler |
| 2007/0010915 A1 | 1/2007 | Burson |
| 2007/0132599 A1 | 6/2007 | DuFaux |
| 2007/0162201 A1 | 7/2007 | Veerasamy |
| 2007/0191991 A1 | 8/2007 | Addink |
| 2007/0293990 A1 | 12/2007 | Alexanain |
| 2008/0027586 A1 | 1/2008 | Hern |
| 2008/0034859 A1 | 2/2008 | Runge |
| 2008/0129495 A1 | 6/2008 | Hitt |
| 2008/0249664 A1 | 10/2008 | Runge |
| 2008/0251602 A1 | 10/2008 | Leggett |
| 2008/0288116 A1 | 11/2008 | Nickerson |
| 2008/0295883 A1 | 12/2008 | Ducellier |
| 2009/0001193 A1 | 1/2009 | Parsons |
| 2009/0007706 A1 | 1/2009 | Hitt |
| 2009/0083656 A1 | 3/2009 | Dukhon |
| 2009/0177330 A1 | 7/2009 | Kah |
| 2009/0179165 A1 | 7/2009 | Parsons |
| 2009/0271044 A1 | 10/2009 | Bangalore |
| 2009/0284598 A1 | 11/2009 | Busch |
| 2010/0030389 A1 | 2/2010 | Palmer |
| 2010/0030476 A1 | 2/2010 | Woytowitz |
| 2010/0092107 A1 | 4/2010 | Mochizuki |
| 2010/0222932 A1 | 9/2010 | O'Connor |
| 2010/0263248 A1 | 10/2010 | Stadjuhar |

(56) References Cited

U.S. PATENT DOCUMENTS

| | | |
|---|---|---|
| 2010/0306012 A1 | 12/2010 | Zyskowski |
| 2011/0093123 A1 | 4/2011 | Alexanian |
| 2011/0224836 A1 | 9/2011 | Hern |
| 2011/0238227 A1 | 9/2011 | Hern |
| 2011/0238228 A1 | 9/2011 | Woytowitz |
| 2011/0238229 A1 | 9/2011 | Woytowitz |
| 2011/0288775 A1* | 11/2011 | Woytowitz ............... G01W 1/14 702/3 |
| 2012/0041607 A1 | 2/2012 | Woytowitz |
| 2012/0072037 A1 | 3/2012 | Alexanian |
| 2012/0089259 A1 | 4/2012 | Williams |
| 2012/0215366 A1 | 8/2012 | Redmond |
| 2012/0221154 A1 | 8/2012 | Runge |
| 2012/0229284 A1 | 9/2012 | Hern |
| 2012/0303168 A1* | 11/2012 | Halahan .................. G05B 15/02 700/284 |
| 2013/0047718 A1* | 2/2013 | Chae ..................... G01F 23/242 73/170.23 |
| 2013/0079934 A1* | 3/2013 | Carskadon ............... G05D 9/12 700/282 |
| 2013/0110293 A1 | 5/2013 | Illig |
| 2013/0253714 A1 | 9/2013 | Williams |
| 2013/0269798 A1 | 10/2013 | Wood |
| 2014/0027539 A1 | 1/2014 | Kim |
| 2014/0039697 A1 | 2/2014 | Weiler |
| 2014/0081471 A1 | 3/2014 | Woytowitz |
| 2014/0148959 A1 | 5/2014 | Levine |
| 2014/0167969 A1 | 6/2014 | Wedig |
| 2014/0172180 A1 | 6/2014 | Woytowitz |
| 2014/0222223 A1 | 8/2014 | Horton |
| 2014/0224008 A1 | 8/2014 | Hern |
| 2015/0032274 A1 | 1/2015 | Runge |
| 2015/0061888 A1 | 3/2015 | Lankford |
| 2015/0112494 A1 | 4/2015 | Woytowitz |
| 2015/0268380 A1* | 9/2015 | Anderson ................. G01F 3/26 73/170.23 |
| 2016/0037736 A1 | 2/2016 | Rainone |
| 2016/0113219 A1 | 4/2016 | Tennyson |
| 2016/0180473 A1 | 6/2016 | Groeneveld |
| 2016/0192602 A9 | 7/2016 | Alexanian |
| 2016/0198645 A1 | 7/2016 | Weatherill |
| 2016/0212952 A1 | 7/2016 | Runge |
| 2016/0219806 A1 | 8/2016 | Thiessen |
| 2016/0327687 A1 | 11/2016 | Nylander |
| 2017/0013810 A1 | 1/2017 | Grabell |
| 2017/0038497 A1 | 2/2017 | Randall |
| 2017/0055467 A1 | 3/2017 | Andrews |
| 2017/0107967 A1 | 4/2017 | Kasten |
| 2017/0112079 A1* | 4/2017 | Eyring ................. A01G 25/165 |
| 2017/0164569 A1 | 6/2017 | Andrews |
| 2018/0014480 A1* | 1/2018 | Montgomery ....... G05B 19/042 |
| 2018/0303049 A1 | 10/2018 | Weiler |
| 2018/0307253 A1 | 10/2018 | Weiler |
| 2019/0020054 A1 | 1/2019 | Kawase |
| 2019/0141920 A1 | 5/2019 | Redmond |
| 2019/0154875 A1* | 5/2019 | Midya ....................... G01F 3/36 |
| 2019/0200547 A1 | 7/2019 | Marsano |
| 2019/0278004 A1 | 9/2019 | Hern |
| 2019/0336994 A1* | 11/2019 | Duffin .................. B05B 3/0486 |
| 2020/0012299 A1 | 1/2020 | Weiler |

FOREIGN PATENT DOCUMENTS

| | | |
|---|---|---|
| GB | 1498545 | 1/1978 |
| GB | 2412735 A | 10/2005 |
| JP | H02196990 A | 8/1990 |
| JP | 2010237038 | 10/2010 |
| KR | 101467705 | 12/2014 |
| WO | 9727733 | 8/1997 |
| WO | 1999039567 | 8/1999 |
| WO | 030760 | 6/2000 |
| WO | 0227109 A1 | 4/2002 |
| WO | 0227419 A1 | 4/2002 |
| WO | 02086546 A1 | 10/2002 |
| WO | 03038539 A1 | 5/2003 |
| WO | 03041874 A1 | 5/2003 |
| WO | 2004005628 | 1/2004 |
| WO | 2004052560 A2 | 6/2004 |

OTHER PUBLICATIONS

U.S. Appl. No. 12/855,615, dated Aug. 12, 2010, Thomas H Runge.
U.S. Appl. No. 13/113,900, dated May 23, 2011, Randall A Hern.
U.S. Appl. No. 13/151,269, dated Jun. 1, 2011, Randall A Hern.
U.S. Appl. No. 13/479,111 dated May 23, 2012, Randall A Hern.
U.S. Appl. No. 16/573,834, dated Sep. 17,2 019, Steven W Weiler.
U.S. Appl. No. 60/421,613, dated Oct. 24, 2002, Thomas H Runge.
U.S. Appl. No. 60/805,331, dated Jun. 20, 2006, David M Redmond.
U.S. Appl. No. 60/866,595, dated Nov. 20, 2006, David G Fern.
U.S. Appl. No. 61/405,119, dated Oct. 20, 2010, Randall A Hern.
U.S. Appl. No. 61/428,151 dated Dec. 29, 2010, Randall A Hern.
"Presenting the Wireless RainSensor for Irrigation Systems" brochure, R&D Engineering, 2000. Printed from archive.org dated May 2001 (5 pgs).
"R&D Engineering Wireless Rain Sensor Products", archive from May 2001 of http://www.rainsensor.com/productsl.htm (3 pgs).
David Instruments; "User Manual Integrated Sensor Suite for Vantage Pro2 and Vantage Pro2 Plus"; https://www.davisinstruments.com/product_documents/weather/manuals/07395-333_IM-6322C-6334.pdf; May 22, 2015; pp. 1-44.
Davis Instruments, Wireless and Cabled Weather Systems, Vantage Pro Catalog, 2 pages, Dec. 2004 (2 pgs).
Dukes et al., Residential Irrigation System Rainfall Shutoff Devices, University of Florida IFAS Extension, 4 pages, Aug. 2002 (4 pgs).
Graphic art Materials Reference Manual, Letraset, 1981, pp. 217 and 220.
Hunter Industries, 'Mini-Clik, The world's most simple, accurate, rugged, and reliable rain sensors', http://hunterindustries.com/Products/Sensors/miniclikintro.html, Mar. 2006, p. 1, Hunter Industries Incorporated, San Marcos, CA. (1 pg.).
Hunter Industries, 'Rain-Clik, The reliable rain sensor with instant shut-off, http://hunterindustries.com/Products/Sensors/rainclikintro html, Apr. 2007, p. 1, Hunter Industries Incorporated, San Marcos, CA. (1 pg.).
Hunter Industries; "Wireless Solar Sync Owner's Manual and Programming Instructions"; Oct. 12, 2008, San Marcos, CA, published at http://web.archive.Org/web/20081012080937/http://www.hunterindustries.com (28 pgs).
Hunter TM Wireless Rain-Clik(TM), Mar. 2006 (2 pgs.).
Hunter, Owner's Manual and Installation Instructions, 'WRC Wireless Rain-Clik(TM) Sensors', published at least on or before Dec. 31, 2005, Hunter Industries Incorporated, San Marcos, California (20 pgs.).
Hunter, Solar Sync Owner's Manual and Programming Instructions, Dec. 2009, San Marcos, CA published at http://web.archive.org/web/20120502050544/http://www.hunterindustries.com/sites/default/files/OM_SolarSync_DOM.pdf (20 pgs).
Iconfactory: Freeware: iPhonica vol. 2, [online] Jan. 30, 2007 [retrieved on Apr. 4, 2007]. Retrieved from the Internet <URL:http://iconfactory.com/freeware/preview/iph2> (2 pgs).
Iconfactory: Freeware: NewtCons, [online] Jun. 1, 1999 [retrieved on Apr. 4, 2007]. Retrieved from the Internet <URL:http://iconfactory.com/freeware/preview/nwtc> (2 pgs).
Iconfactory: Freeware: Winter Wonderland, [online] Dec. 23, 2003 [retrieved on Apr. 4, 2007]. Retrieved from the Internet <URL:http://iconfactory.com/freeware/preview/wwld> (2 pgs.).
InterfaceLIFT: Microsoft Windows Icons (by date), [online] Dec. 24, 2006 [retrieved on Apr. 4, 2007]. Retrieved from the Internet <URL:http://interfacelift.com/icons-win/> (4 pgs).
Logo Lounge, by Catharine Fishel and Bill Gardner, Rockport Publishers, Gloucester, MA 2003 (2 pgs).
PCT; App. No. PCT/US2018/065406; International Search Report and Written Opinion datedApr. 29, 2019.
R & D Engineering, Inc.; "The Wireless RainSensor Installation Guide"; published at http://web.archive.org/web/20010604063747/http://rainsensorcom/images/instrpdf; Jun. 4, 2001; pp. 1-8; R & D Engineering, Inc. (8 pgs.).

(56) References Cited

OTHER PUBLICATIONS

R&D Engineering, Inc., New Plus+ Model Catalog, 2002 (2 pgs.).
Rain Bird, Central Computer Control System, Maxicom, 'Landscape Irrigation Products, 1993-1994 Catalog', Cover page and pp. 98-99, US (3 pgs.).
Rain Bird, Central Control System, Maxicom, Feb., 1993, Rain Bird Sales, Inc.; US (19 pgs.).
Rain Bird, Central Control System, Maxicom, Jun., 1994, Cover page and pp. 2-8, Rain Bird Sales, Inc., US (8 pgs.).
Rain Bird, Components of the Maxicom System, Feb. 9, 1994, p. 3.2, Section 3, US. (1 pg.).
Rain Bird, ET Manager Series, Installation and Operation Manual, Apr. 2007, Rain Bird Corporation, Tucson, AZ (80 pgs.).
Rain Bird, Maxicom Guide to Operations, Oct. 1, 1994, Chapter 7, Rain Bird Corporation, Glendora, CA (54 pgs).
Rainbird Corporation, 'RSD Series Rain Sensor', http://www.rainbird.com/landscape/products/controllers/rsd.htm, Dec. 2007, pp. 1-2, Rainbird Corporation, Tucson, AZ. (2 pgs.).
Signs and Symbols: Their Design and Meaning, by Adrian Frutiger, Watson-Guptill Publications, New York, NY, 1978 Part 1, 1979 Part 2, 1981 Part 3, p. 356 (4 pgs.).
Symbol Source Book, by Henry Dreyfuss, Van Nostrand Reinhold Company, New York, NY, 1972, pp. 27, 35, and 160 (4 pgs.).
Toro, "TMC-424 Series Turf Catalog", 2008; pp. 88-89, The Toro Company, Riverside, CA (2 pgs.).
Toro, User's Guide, "Wireless Rain Sensor Series Rain Sensor, Model TWRS and Rain/Freeze Sensor, Model TWRFS", published at least on or before Dec. 31, 2005, The Toro Company, Irrigation Division (28 pgs.).
Trenholm et al., "How to Calibrate Your Sprinkler System", University of Florida IFAS Extension, Jan. 2001 (2 pgs.).
U.S. Appl. No. 61/405119, filed Oct. 20, 2010, Hern, priority claimed in U.S. Pat. No. 9,144,204 and priority to the present application, U.S. Appl. No. 14/830,600 (available in USPTO's IFW system).
U.S. Appl. No. 61/428151, filed Dec. 29, 2010, Hern, priority claimed in U.S. Pat. No. 9,144,204 and priority to the present application, U.S. Appl. No. 14/830,600 (available in USPTO's IFW system).

* cited by examiner

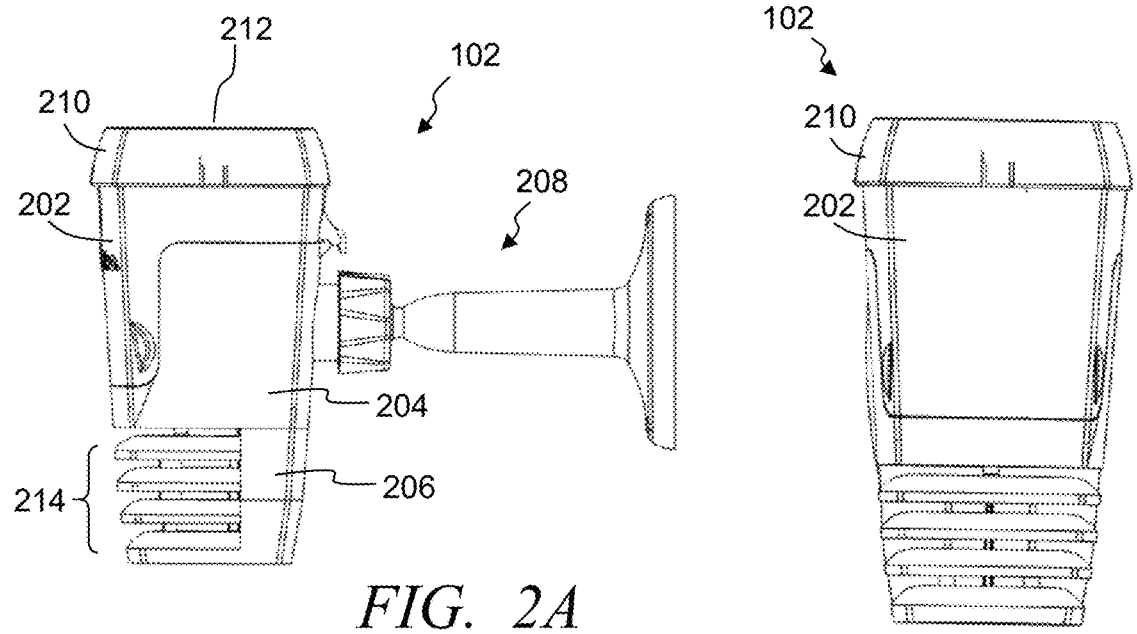
FIG. 2A
FIG. 2B
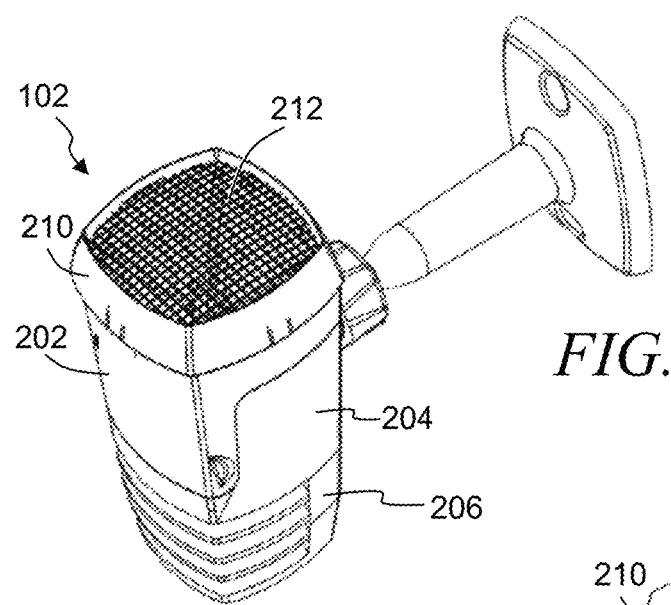
FIG. 2C
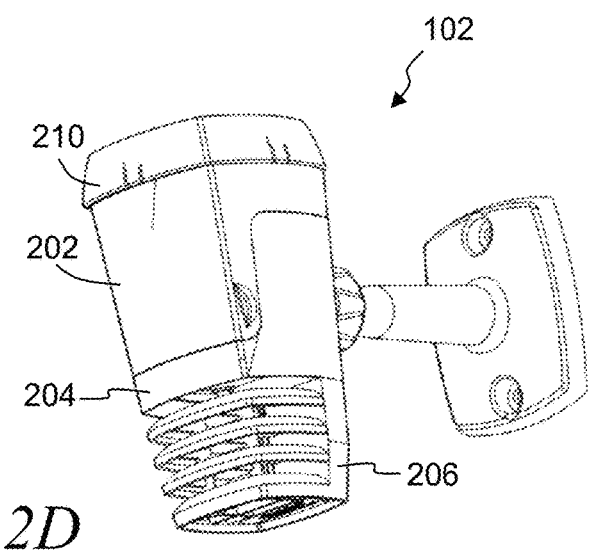
FIG. 2D

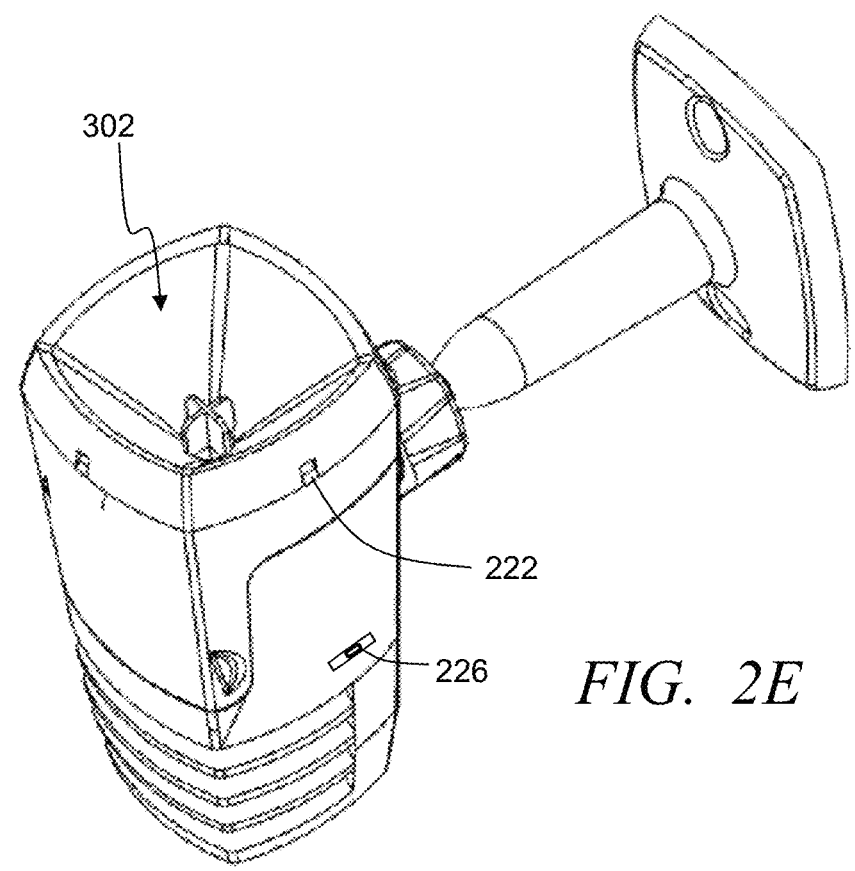
FIG. 2E
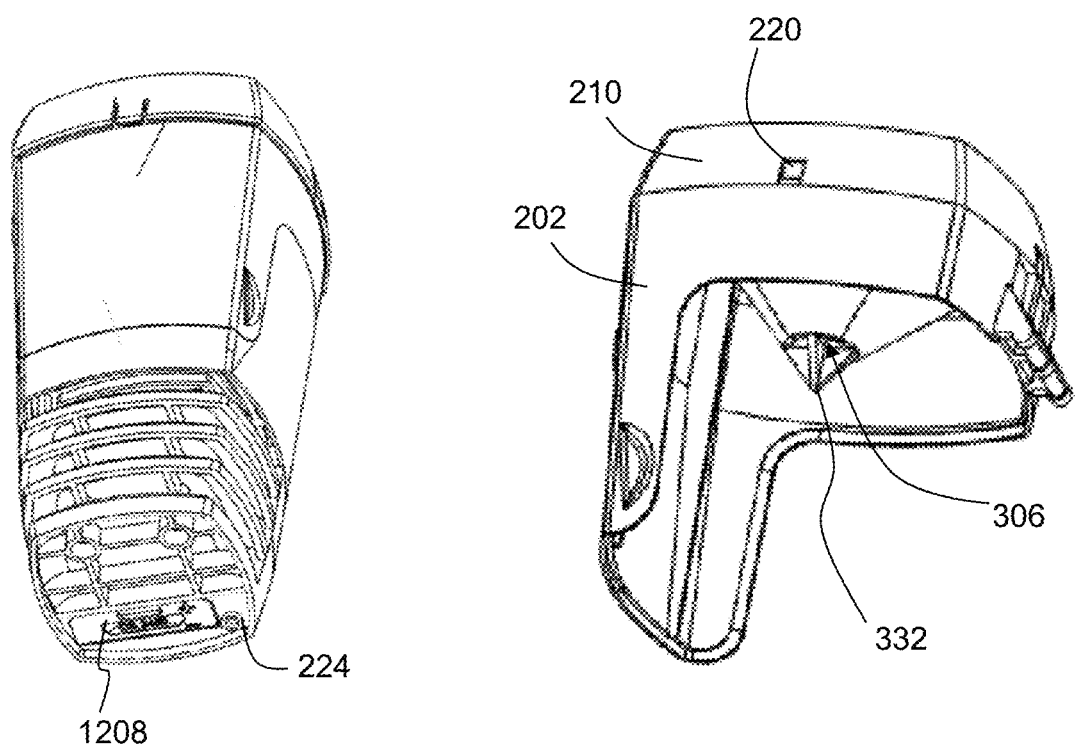
FIG. 2F
FIG. 2G

US 11,006,589 B2

WEATHER OVERRIDE IRRIGATION CONTROL SYSTEMS AND METHODS

CROSS-REFERENCE TO RELATED APPLICATION

This application claims the benefit of U.S. Provisional Application No. 62/611,981, filed Dec. 29, 2017, which is incorporated herein by reference in its entirety.

TECHNICAL FIELD

This invention relates generally to an external sensor system and external irrigation interruption.

BACKGROUND

Irrigation is critical to maintaining healthy plant life in many different geographic regions. Applying irrigation water, however, can be costly. Accordingly, there is a need to improve the control of irrigation.

BRIEF DESCRIPTION OF THE DRAWINGS

Disclosed herein are embodiments of systems, apparatuses and methods pertaining an external sensor system and external irrigation interruption. This description includes drawings, wherein:

FIGS. 2A-2D are a side view, a front view, an overhead perspective view, and a side perspective view of an exemplary sensor system, in accordance with some embodiments;

FIG. 2E shows an overhead perspective view of the exemplary sensor system with the funnel housing, debris frame and debris screen removed, in accordance with some embodiments;

FIG. 2F shows a lower perspective view of an exemplary sensor system, in accordance with some embodiments;

FIG. 2G shows a perspective view of an exemplary funnel housing and exemplary debris frame separated from the central housing, in accordance with some embodiments;

Figure 1:
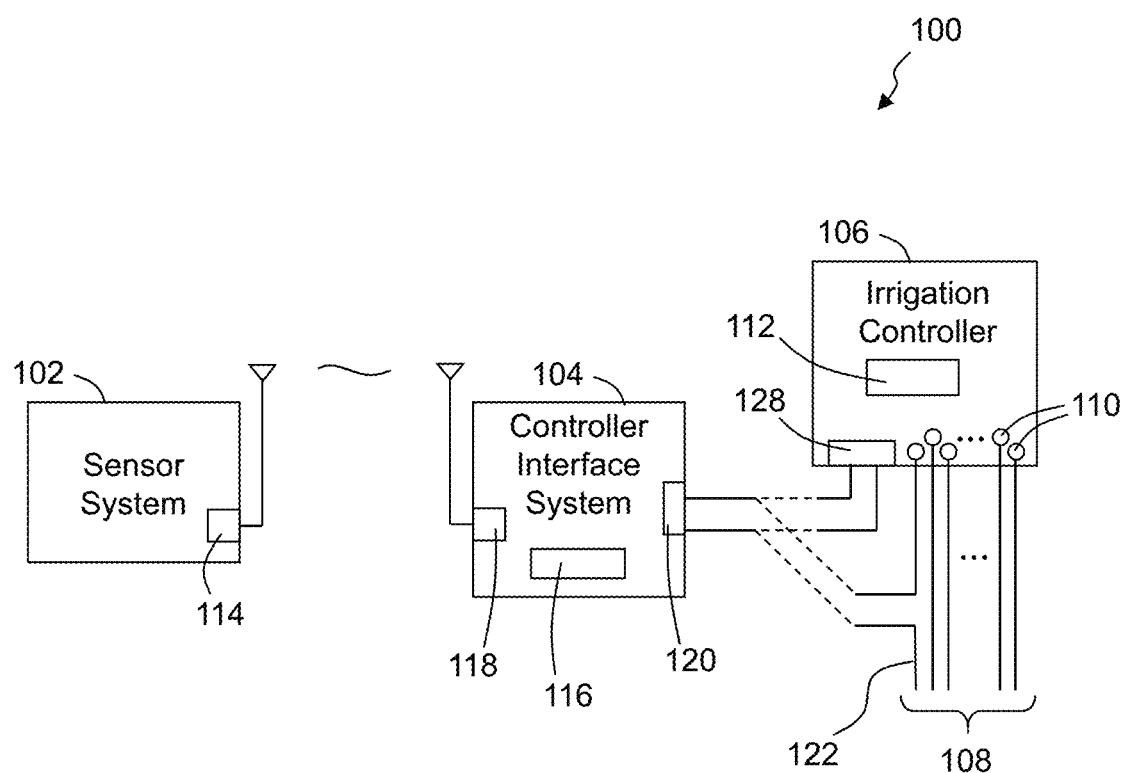
FIG. 1 illustrates a simplified block diagram of an exemplary irrigation interruption system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to control irrigation through the interruption of an irrigation controller based on locally detected weather data. In some embodiments, provide an irrigation sensor system, comprising: a rain funnel comprising an upper opening and at least one wall tapering from the upper opening to a lower aperture; and a tipping bucket positioned to receive water falling from the lower aperture while the tipping bucket is positioned such that a central longitudinal axis of the tipping bucket is not aligned with an axis extending through the lower aperture of the funnel.

Some embodiments provide an irrigation sensor system is provided that includes: a rain funnel comprising an upper opening and at least one wall tapering from the upper opening to a lower aperture, a tipping rain bucket sensor, temperature sensor, a protection diaphragm, a trigger detector, communication transceiver, and a sensor control circuit. The tipping rain bucket sensor in some embodiments comprises: a tipping bucket positioned aligned with the lower aperture of the funnel and comprising a first rain bucket, a second rain bucket positioned adjacent the first rain bucket and an extended wall extending away from and between the first and second rain buckets to alternately align a first face extending from the first rain bucket and a second face extending from the second rain bucket with the lower aperture; a bucket holder, wherein the tipping bucket is pivotally secured with the bucket holder enabling the tipping bucket to transition between a first position with the first face of the extended wall aligned with the aperture to direct water into the first rain bucket and a second position with the second face of the extended wall aligned with the aperture to direct water into the second rain bucket; and a trigger secured relative to the extended wall to transition between a first station when the tipping bucket is in the first position, and a second station when the tipping bucket is in the second position. In some embodiments, the temperature sensor is positioned below the rain sensor and vertically aligned with at least a portion of the tipping bucket. The protection diaphragm is positioned between the rain sensor and the temperature sensor, and comprises a water disbursement plate and a plurality of drain apertures. The water disbursement plate extends over the temperature sensor and to the plurality of drain apertures causing rain water released by the first and second rain buckets to drain through the drain apertures away from the temperature sensor. The trigger detector is positioned relative to the trigger and configured to activate in response to the trigger passing within a threshold distance of the trigger detector and output a tip signal. The sensor control circuit communicatively couples with the trigger detector and the transceiver, wherein the sensor control circuit is configured to receive the tip signals and cause the transceiver to transmit rain signals corresponding to a predefined amount of accumulated rain in response to the tipping of the tipping bucket.

Some embodiments provide an irrigation interruption system that comprises: a sensor system, an override controller interface system; and an irrigation controller separate from the sensor system and the controller interface system. The sensor system includes sensor control circuit, a temperature sensor, and a tipping rain bucket sensor that is configured to communicate detected rain signals corresponding to an amount of accumulated rain in response to each tipping of the rain sensor. The override controller interface system is separate from and communicatively coupled with the sensor system, and comprises an interface control circuit. The irrigation controller comprises an irrigation control circuit, a set of activator output couplers configured to couple to remote irrigation valves, and memory coupled to the irrigation control circuit and configured to store at least one watering schedule to be executed by the irrigation control circuit in defining when to turn on and off the irrigation valves. Further, the interface control circuit is configured to receive the rain signals and temperature sensor data from the sensor system, determine when a summation of accumulated rain over a first threshold period of time is greater than a user defined first accumulated rain threshold, interrupt activation of the valves when the summation of accumulated rain is greater than the first accumulated rain threshold, identify when a user defined first resume irrigation threshold time period has expired since a last of the rain signals is received, and remove the interruption of the activation of the valves to allow further activation of the valves by the irrigation controller.

FIG. 1 illustrates a simplified block diagram of an exemplary irrigation interruption system 100, in accordance with some embodiments. The irrigation interruption system includes one or more sensor systems 102, one or more override controller interface systems 104 and at least one irrigation controller 106. The irrigation controller 106, in some embodiments, is a stand-alone and/or satellite irrigation controller configured to couple with one of multiple output couplers 110 configured to couple with and drive a respective one of multiple valve activation output lines 108 that each electrically couple with one or more valves and/or other such irrigation devices. For example, the irrigation controller 106 may be an irrigation controller from the Rain Bird Corporation (e.g., SST Series controller, ESP-LX series controller, ESP-modular series controller, ESP-SMTe series controller, ESP-TM2 Series controller, etc.), or other irrigation controllers that are configured to implement a watering schedule to activate irrigation valves to control the delivery water to water distributing devices (e.g., sprinklers, drip valves, etc.).

The irrigation controller 106 includes one or more irrigation control circuits 112 that control the activation of one or more of the set of activator output couplers 110 in accordance with the irrigation watering schedule executed by the irrigation control circuit and defining when to turn on and off the irrigation valves. Typically, the irrigation control circuit includes and/or couples with computer memory that stores one or more watering schedules, programming, code, operating parameters, log data, timing information, date information, restrictions, location information, and/or other relevant information for use by the irrigation control circuit and/or to be communicated by the irrigation controller.

The sensor system 102 is distinct and separate from the controller interface system 104 and the irrigation controller 106. Typically, the sensor system is placed in a location remote from the controller interface system and the irrigation controller in a place exposed to weather conditions, including rain, snow, wind and the like. The sensor system 102 is in communication with the controller interface system 104, and typically does not communicate directly with the irrigation controller 106. In some implementations, the sensor system includes one or more wired and/or wireless transmitter and/or transceivers 114. In some embodiments, the transceiver is a wireless transceiver providing communication between the sensor system 102 and the controller interface system 104 is via wireless communication, such as but not limited to Wi-Fi, Bluetooth, cellular, radio frequency, other such wireless communication methods, or a combination of two or more of such wireless communication methods. In some implementations, the sensor system may be coupled via wired, fiber optic, a distributed communication network, and/or other such methods with the controller interface system.

The controller interface system 104 includes an interface control circuit 116, one or more wired and/or wireless transmitter and/or transceivers 118, and at least one switch system 120. The controller interface system 104 is typically in wireless communication with the sensor system 102, which in some embodiments is configured to measure temperature and an amount of accumulated rainfall. The controller interface system utilizes sensor data received from the sensor system 102 to determine whether and when to interrupt irrigation without input from the irrigation controller 106. Accordingly, the controller interface system provides a rainfall and/or temperature cut off feature to the irrigation system.

Again, the sensor system 102 is positioned separate and remote from the irrigation controller 106 at a location to receive rainfall (e.g., on a roof, on a fence, on a light pole, etc.). Sensor data signals are transmitted from the sensor system to the controller interface system 104. In some implementations, the controller interface system 104 is located near the irrigation controller 106. A threshold level of rainfall accumulation and/or a threshold temperature are utilized by the controller interface system to determine when to interrupt the activation of one or more valves, pumps, and/or other such devices. In some embodiments, the controller interface system 104 includes a user interface to allow a user to set a threshold level of rainfall accumulation above which point irrigation is intended to be interrupted, a temperature threshold, a threshold irrigation delay duration, and/or other such parameters. For example, the user can define at what level of rainfall the user would like irrigation to be interrupted and/or define below what temperature the user would like irrigation to be interrupted. The controller interface system 104 compares the signals received from the sensor system and determines whether one or more rainfall thresholds and/or one or more temperature thresholds have been met. When one or both thresholds have been exceeded, the controller interface system interrupts irrigation being executed and/or to be executed by the irrigation controller over at least a threshold period of time.

In some embodiments, the controller interface system in interrupting irrigation opens one or more switches of a switch system 120 that is electrically in line with the common return line 122 that is coupled to the irrigation valves, pumps and other such devices controlled by the irrigation controller 106. By opening or "breaking" the common line 122, the electrical path from the output line 108 to the valves and back to the irrigation controller via the common line 122 is opened resulting in the loss of a power signal being delivered to the valve and thus, stopping irrigation. The interruption occurs outside of the irrigation controller 106 and typically without the irrigation controller being notified, signaled or otherwise having knowledge of such interruption. When a switch in the controller interface system is opened, the common line 122 is effectively opened causing the interruption of the irrigation without action by the irrigation controller, and in some instances, with notification and/or detection by the irrigation controller. In other applications, the switch system 120 is coupled to the sensor input 128 and when a switch is opened, the voltage detected by the irrigation controller across the sensor input 128 changes and the irrigation controller identifies that the irrigation controller should interrupt its own irrigation until the switch is closed.

FIGS. 2A-2D are a side view, a front view, an overhead perspective view, and a side perspective view of an exemplary sensor system 102, in accordance with some embodiments. The sensor system includes a housing, which in some implementations comprises a funnel housing 202, a central housing 204 and a base housing 206. The central housing 204, in some applications cooperates with a mounting system 208, which may enable the sensor system to be tilted to allow for mounting on surfaces having different angles, and in some instances allows tilting in at least two dimensions. Typically, the sensor system includes a debris screen 212, and in some embodiments includes a debris frame with which the debris screen is secured. The debris frame is configured to removably cooperate with the funnel housing 202. In some embodiments, the sensor system 102 includes a set of multiple louver plates 214.

Figure 3A:
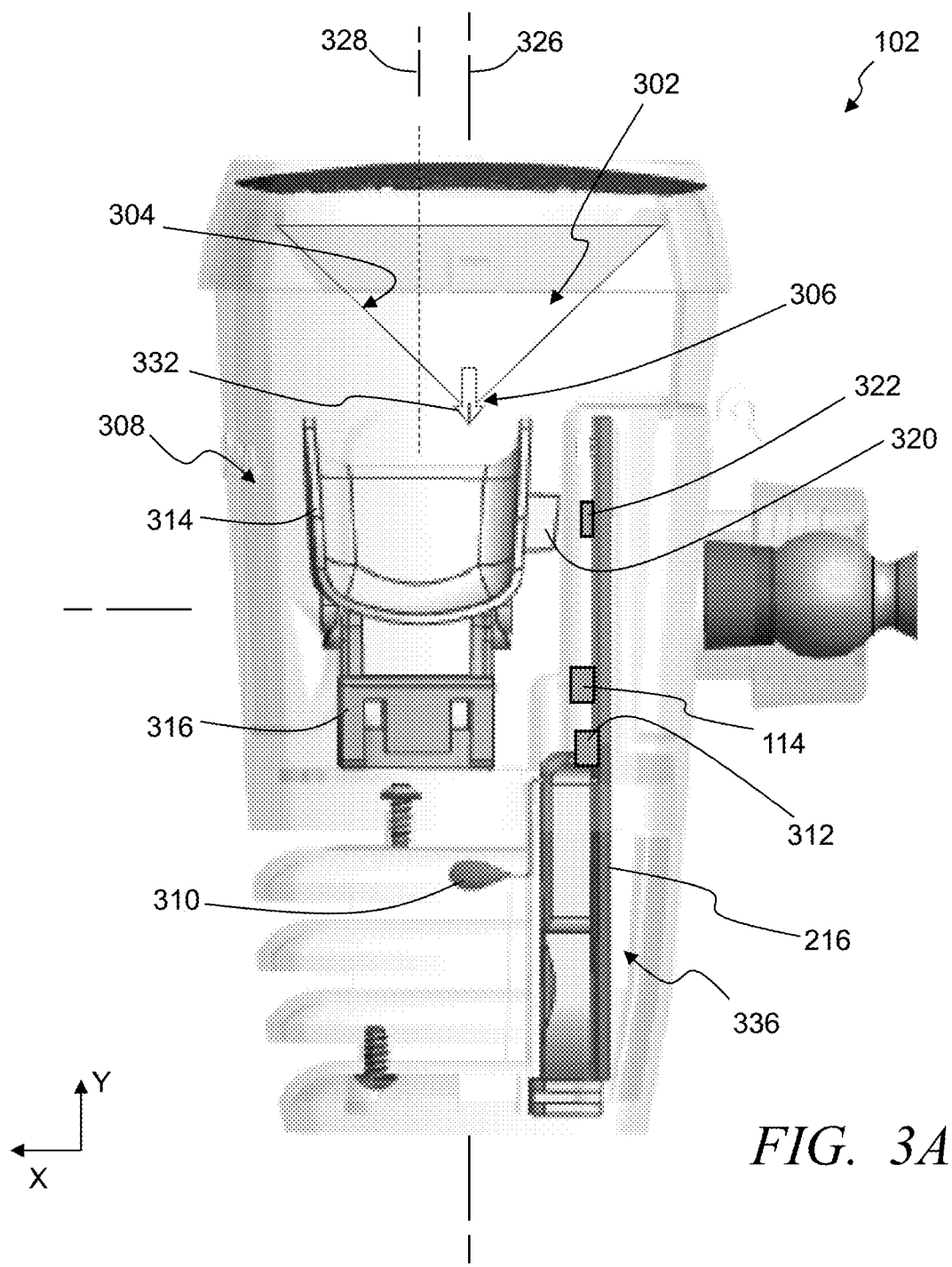
FIG. 3A illustrates a partially transparent, side view of an exemplary sensor system, in accordance with some embodiments.
Figure 3B:
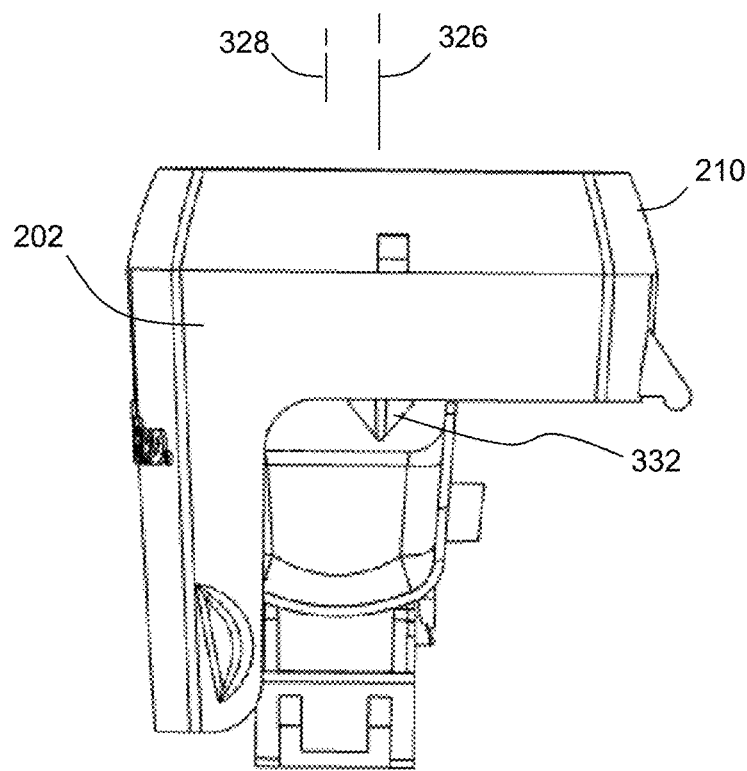
FIG. 3B illustrates a side view of the funnel housing, cooperated with the debris frame, relative to the tipping bucket, in accordance with some embodiments.
Figure 3C:
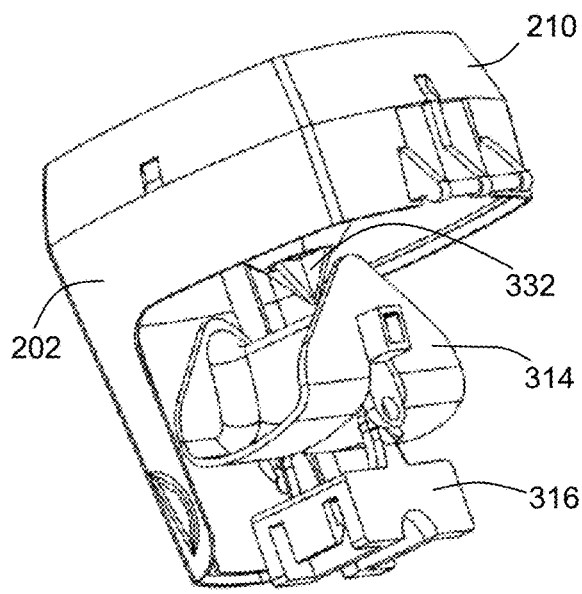
FIG. 3C shows a perspective view of the funnel housing, cooperated with the debris frame, relative to the tipping bucket, in accordance with some embodiments.

FIG. 2E shows an overhead perspective view of the exemplary sensor system 102 with the funnel housing 202, debris frame 210 and debris screen 212 removed, in accordance with some embodiments. FIG. 2F shows a lower perspective view of an exemplary sensor system 102, in accordance with some embodiments. FIG. 2G shows a perspective view of an exemplary funnel housing 202 and exemplary debris frame 210 separated from the central housing, in accordance with some embodiments. FIG. 3A illustrates a partially transparent, side view of an exemplary sensor system 102, in accordance with some embodiments. FIG. 3B illustrates a side view of the funnel housing 202, cooperated with the debris frame 210, relative to the tipping bucket 314, in accordance with some embodiments. FIG. 3C shows a perspective view of the funnel housing 202, cooperated with the debris frame 210, relative to the tipping bucket 314, in accordance with some embodiments.

Referring to FIGS. 2A-3D, the funnel housing 202 includes a rain funnel 302 that has an upper opening through which rain falls and one or more funnel walls 304 tapering from the upper opening to a lower aperture 306. The sensor system further includes a rain sensor system. In some embodiments, the rain sensor system is implemented through a tipping rain bucket sensor 308. The sensor system, in at least some instances, includes one or more temperature sensors 310. Further, the sensor system 102 includes at least one sensor control circuit 312 communicatively coupled with the tipping rain bucket sensor 308 and the temperature sensor 310. As introduced above, the sensor system 102 further includes one or more communication transceivers 114, which are communicatively coupled with the sensor control circuit 312. The sensor control circuit is configured to receive tip signals from the tipping bucket rain sensor 308 and temperature data from the temperature sensor 310. Further, the sensor control circuit is configured to cause the transceiver to transmit rain signals corresponding to a predefined amount of accumulated rain in response to the tipping of the tipping bucket and/or transmit temperature data or signals to the controller interface system 104. As indicated above, in some implementations the transceiver 114 is a wireless transceiver configured to at least wirelessly transmit sensor data (e.g., rain signals and/or temperature data) to the controller interface system 104.

Figure 3D:
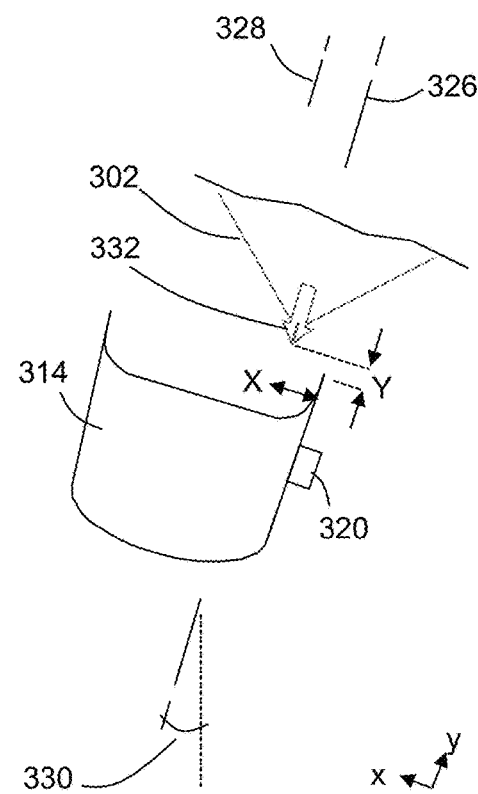
FIG. 3D illustrates a partial, simplified side view of an exemplary tipping bucket relative to the funnel and drip extension when the sensor system is mounted at an angle from vertical, in accordance with some embodiments.
Figure 4:
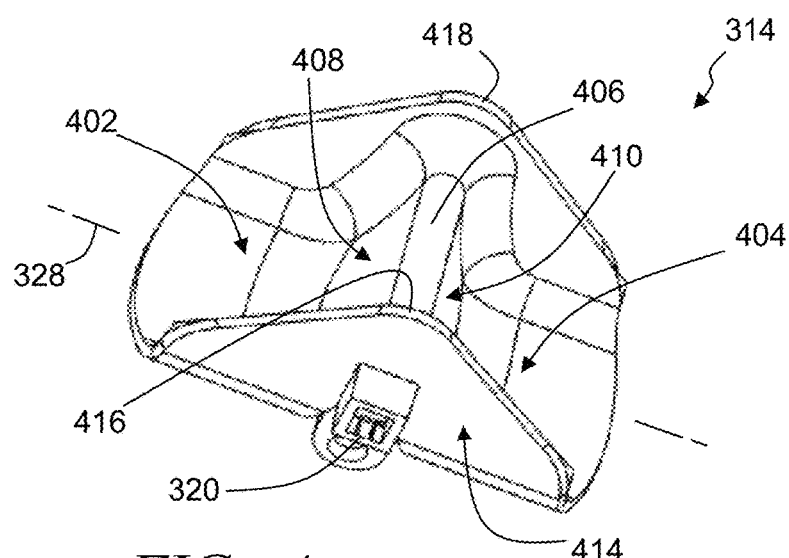
FIG. 4 illustrates an overhead perspective view of an exemplary tipping bucket and trigger placement in accordance with some embodiments.
Figure 5:
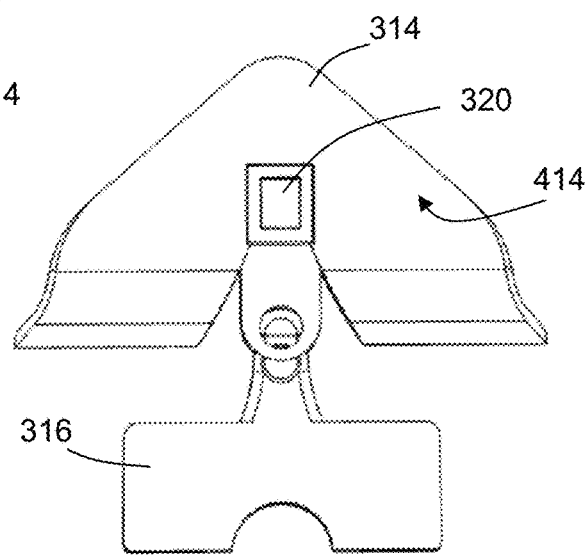
FIG. 5 illustrates a simplified side view of an exemplary tipping bucket and an exemplary bucket holder, in accordance with some embodiments.
Figure 6:
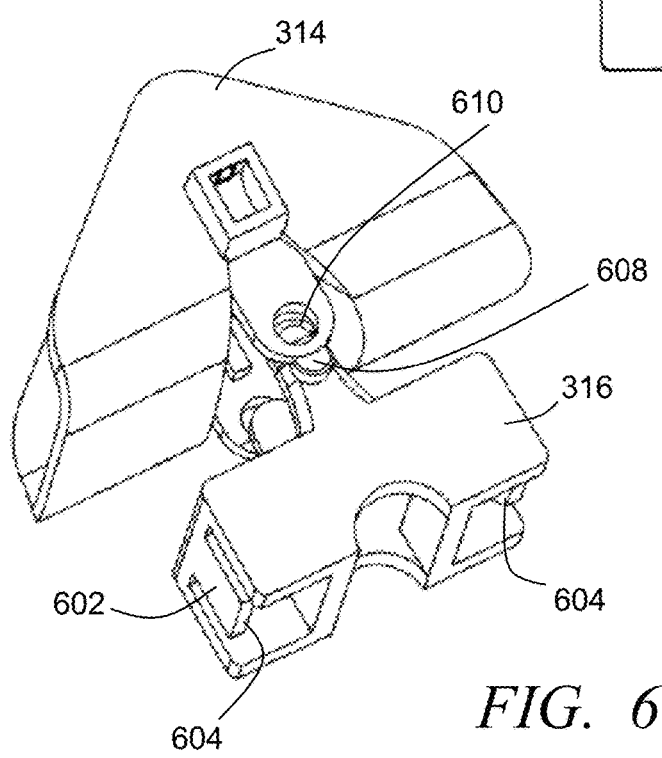
FIG. 6 illustrates a perspective view of exemplary tipping bucket and an exemplary bucket holder, in accordance with some embodiments.

The tipping rain bucket sensor 308 includes a tipping bucket 314 pivotably secured with a bucket holder 316 enabling the tipping bucket 314 to transition between first and second positions. FIG. 4 illustrates an overhead perspective view of an exemplary tipping bucket 314 in accordance with some embodiments. FIG. 5 illustrates a simplified view of an exemplary tipping bucket 314 and an exemplary bucket holder 316, in accordance with some embodiments. FIG. 6 illustrates a perspective view of exemplary tipping bucket 314 and an exemplary bucket holder 316, in accordance with some embodiments. Referring to FIGS. 2A-6, the tipping bucket 314 includes a first rain bucket 402 and a second rain bucket 404 that is positioned adjacent the first rain bucket. An extended wall 406 is included that extends away from and between the first and second rain buckets. The extended wall includes a first face 408 forming part of and extending from the first bucket 402, and an opposing, mirrored second face 410 forming part of and extending from the second bucket 404. In some embodiments, a trigger 320 is secured relative to the extended wall, and typically on an exterior side wall 414 of the tipping bucket 314.

The tipping bucket 314 is pivotably secured with the bucket holder 316 enabling the tipping bucket to transition between a first position with the first face 408 of the extended wall 406 aligned with the lower aperture 306 to direct water dripping from the lower aperture into the first rain bucket 402, and a second position with the second face 410 of the extended wall 406 aligned with the lower aperture 306 to direct water dripping from the lower aperture into the second rain bucket. Accordingly, when in the tipping bucket is in the first position the extended wall is tilted at a first acute angle relative to an axis extending perpendicular through the lower aperture with the first face aligned with that axis extending perpendicular through the lower aperture. Alternatively, when the tipping bucket is in the second position the extended wall is tilted at a second acute angle relative to the axis extending perpendicular through the lower aperture, and which is a mirrored angle of the first acute angle, with the second face aligned with that axis extending perpendicular through the lower aperture.

The sensor system further includes one or more trigger detectors 322 or switches positioned relative to the trigger 320 and configured to activate in response to the trigger 320 passing within a threshold distance of the trigger detector, and to output a tip signal to the sensor control circuit 312 and/or the transceiver 114. In some embodiments, the trigger 320 is a magnet or other structure that can be wirelessly detected by the trigger detector 322. For example, the trigger 320 may include a magnet and the trigger detector may include a hall effect sensor, reed switch, other such detector or a combination of two or more of such detectors. In some embodiments, the trigger 320 is secured relative to the extended wall 406 and transitions in accordance with the tipping of the tipping bucket 314 between a first station when the tipping bucket is in the first position, and a second station when the tipping bucket is in the second position. Each time the tipping bucket tips, the trigger 320 passes within the threshold distance of the trigger detector 322 to allow the trigger detector to detect the tipping transition. Each tipping of the tipping bucket corresponds to a predefined accumulation of a volume or quantity of water. The tipping causes the accumulated water to be tipped out of the bucket, and subsequent rain captured by the funnel 302 is directed into the other bucket that is in an elevated position relative to the other bucket. The tipping bucket 314 is typically formed symmetrical and/or mirrored long the extended wall between the first bucket and the second bucket. Each of the first and second buckets are precisely configured to accumulate substantially the same, and typically the same volume or weight of water. Once the predefined accumulated quantity of water is captured, the tipping bucket tips to release the water from that bucket and cause further water to be directed by the extended wall into the other of the two buckets until the predefined accumulation of water is captured in that bucket causing a subsequent tipping. The tipping continues as the rain continues. Each tipping is detected by the detector 322.

In some embodiments, the sensor system 102 is implemented with a relatively small size and/or occupying a relatively small volume. Other conventional tipping rain bucket sensors typically have significantly larger sizes to allow those other systems to fit the components of the sensor within the sensor systems and collect sufficient quantities of rain. Further, other sensor systems often do not include temperature sensors or the temperature sensors are separated from the rain sensor, such as in a separate housing, or secured external to the rain sensor. The current sensor system 102, however, provides a reduced size in part by shifting the tipping bucket 314 out of a central alignment with the funnel 302 and/or a central axis of the sensor system. This is counter intuitive to an expected optimal operation because this shift out of direct axial alignment of the tipping bucket would be expected to result in a failure to direct all of the water captured by the funnel into one of the buckets 402, 404. Further, those skilled in the art would typically consider such a mis-alignment to be detrimental to the sensor system, e.g., by causing less than all of the water dripping to land in the bucket, causing a mis-balance of the bucket, and so on.

In some embodiments of the sensor system 102, however, the funnel 302 is positioned with the lower aperture 306 at least partially mis-aligned from a longitudinal central axis 328 of the tipping bucket 314. In some implementations, for example, the funnel 302 is positioned with the lower aperture 306 positioned about an axis 326, which may coincide with a central axis of the sensor system 102. Further, a central longitudinal axis 328 of the tipping bucket 314, which is perpendicular to the axis about which the tipping bucket tips, is off-set from and not aligned with the central axis 326 and not aligned with the lower aperture of the funnel. Shifting the tipping bucket 314 provides additional space within the central housing 204 and/or funnel housing 202 to position the trigger detector 322 and/or a circuit board with which the trigger detector is mounted, which in part enables a reduced volume and size of the sensor system. Further, in some embodiments, the temperature sensor 310 is positioned below the rain sensor and vertically aligned with at least a portion of the tipping bucket 314. Accordingly, dimensions of the sensor system can be further reduced by positioning the temperature sensor below and at least partially aligned with the tipping bucket.

Further, with the off-set between the central portion of the tipping bucket 314 and the lower aperture 306, some embodiments are configured to position the bottom of the funnel and the aperture 306 to be relatively close to the tipping bucket 314. In some embodiments, the funnel 302 comprises a drip extension 332 that extends from the lower aperture 306, and the end of the drip extension 332 is positioned to be within a threshold vertical separation distance from upper edges 416, 418 of opposing lateral side walls of the tipping bucket. The vertical separation provides a margin of error in mounting the sensor system. It is anticipated that in some instances, the sensor system may not be mounted in a completely vertical orientation. Accordingly, the vertical separation provides at least some compensation for the fact that water from the funnel will drip vertically even when the sensor system is not vertically mounted in order to ensure, within threshold margins, water from the lower aperture at least contacts the lateral sides of the tipping bucket to be directed to and captured by one of the first and second buckets. FIG. 3D illustrates a partial, simplified side view of an exemplary tipping bucket 314 relative to the funnel 302 and drip extension 332 when the sensor system is mounted at an angle 330 from vertical, in accordance with some embodiments. In some applications, for example, the threshold vertical separation distance (Y) is proportional to a lateral distance (X) between the end of the drip extension and the upper edge 416 of the opposing side wall upon which the trigger 320 is positioned (and in some instances, the lateral side wall closest to the drip extension) and a mounting threshold tilt angle 330 away from vertical (e.g., less than 20 degrees, and typically less than 15 degrees away from vertical). In some embodiments, the drip extension 332 extends from the lower aperture, and an end of the drip extension is positioned at least level with the upper edge 416 of the opposing lateral side walls of the tipping bucket extending from the extended wall 406. In some embodiments, the sensor system 102 may include one or more level indicators 226 (e.g., translucent tube with a bubble within colored liquid, digital alignment system (e.g., gyroscopic sensor, accelerometer, etc.), or the like) positioned on an exterior and/or interior of the housing of the sensor system to assist the user in mounting the sensor system and orienting the sensor system.

Figure 7:
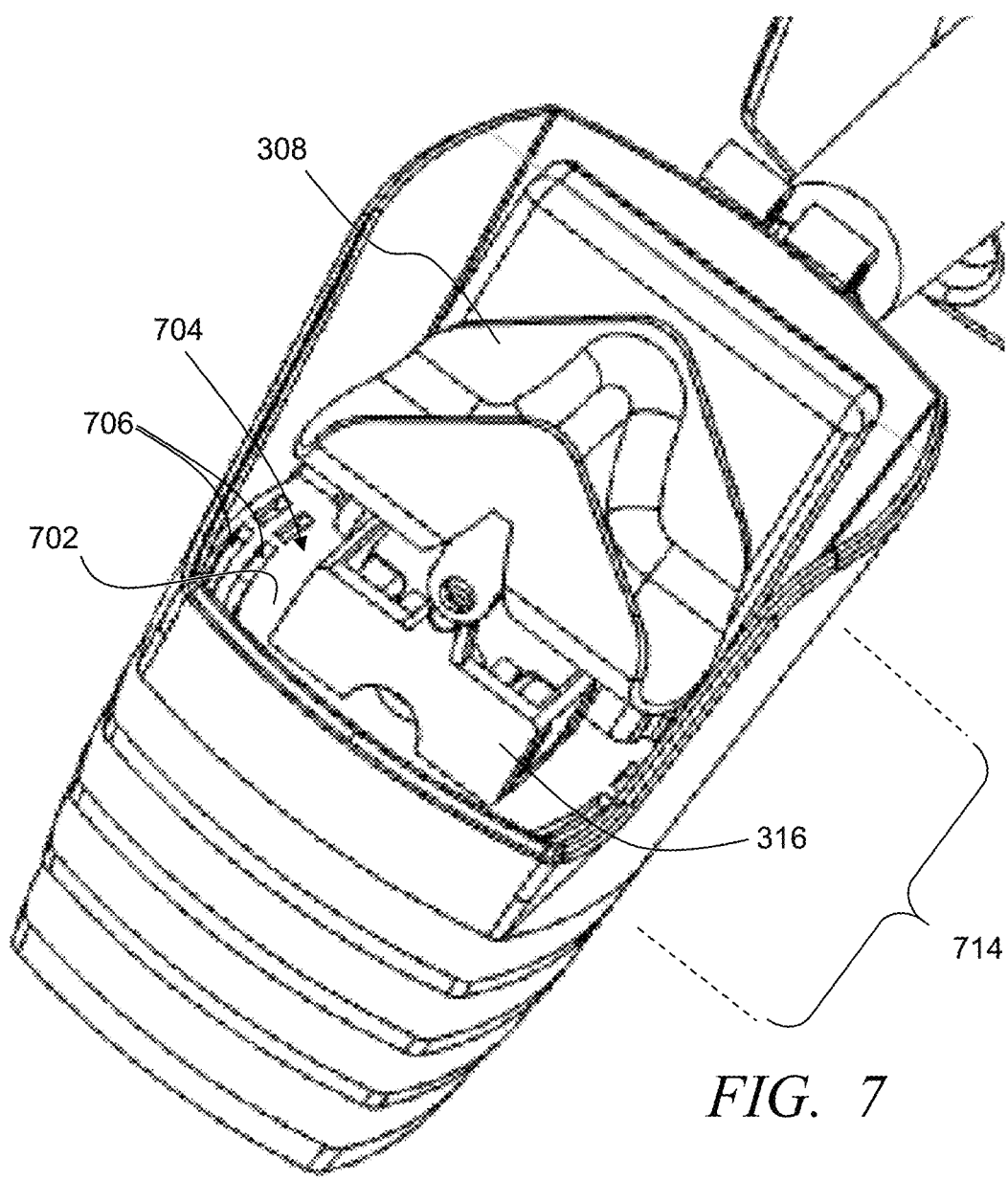
FIG. 7 illustrates a perspective view of an interior of an exemplary central housing with the bucket holder secured within the central housing and the tipping bucket secured with the bucket holder, in accordance with some embodiments.
Figure 8:
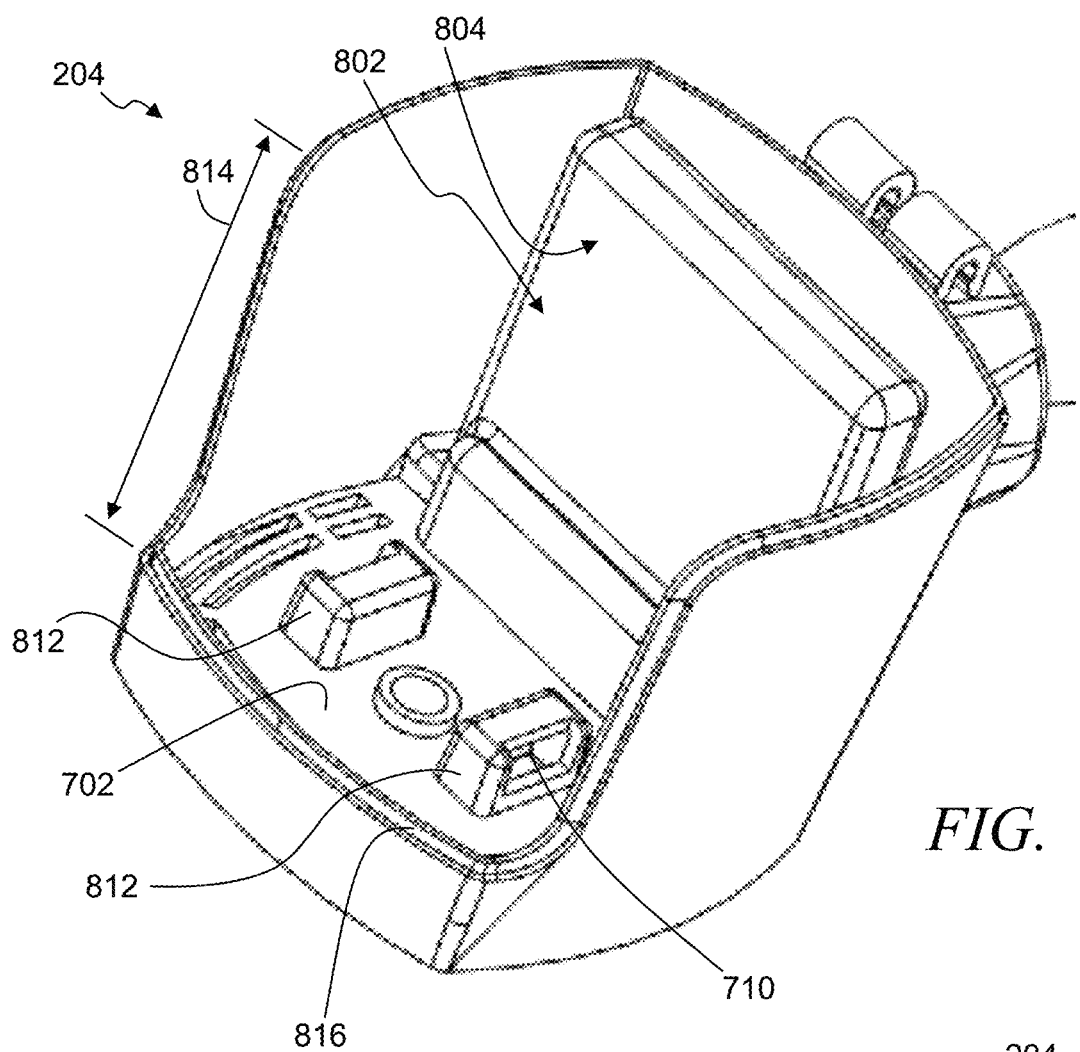
FIG. 8 illustrates an elevated perspective view of an exemplary central housing comprising a protection diaphragm, in accordance with some embodiments.
Figure 9:
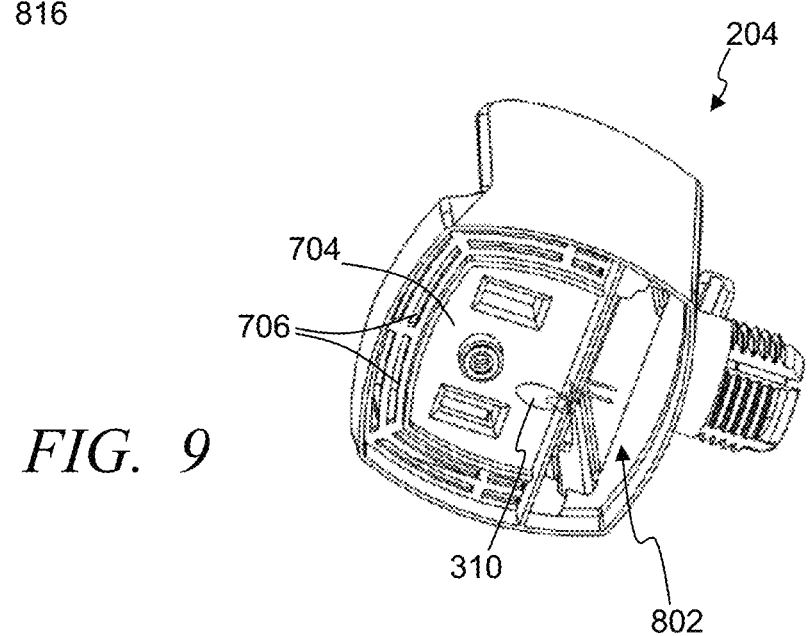
FIG. 9 illustrates a bottom perspective view of an exemplary central housing and a temperature sensor, in accordance with some embodiments.

As described above, when the tipping bucket 314 tips, for example, from the first position to the second position, the accumulated quantity of water flows out of the first bucket 402. With the temperature sensor 310 being positioned below the tipping bucket, some embodiments further include a protection diaphragm 702 positioned between the rain sensor and the temperature sensor 310. FIG. 7 illustrates a perspective view of an interior of an exemplary central housing 204 (where the funnel housing 202 is not being illustrated) with the bucket holder 316 secured within the central housing and the tipping bucket 314 secured with the bucket holder, in accordance with some embodiments. FIG. 8 illustrates an elevated perspective view of an exemplary central housing 204 comprising the protection diaphragm 702, in accordance with some embodiments. FIG. 9 illustrates a bottom perspective view of an exemplary central housing 204 and the temperature sensor 310, in accordance with some embodiments. Referring to FIGS. 7-9, the protection diaphragm 702 is position between the tipping bucket 314 and the temperature sensor 310. In some embodiments, diaphragm is positioned to direct water dumped from the first and second buckets 402 and 404 away from the temperature sensor 310. The diaphragm can, in some applications, include a water disbursement plate 704, and one or more drain apertures 706, grates, grills or the like. The water disbursement plate 704 extends over the temperature sensor 310 and to the plurality of drain apertures 706 causing rain water released by the first and second rain buckets to drain through the drain apertures away from the temperature sensor. Accordingly, the temperature sensor 310 can be positioned at least partially in alignment with the tipping bucket 314 while water released from the tipping bucket is directed away from the temperature sensor. By incorporating the temperature sensor under the tipping bucket, the sensor system can be implemented with a reduced size than other tipping bucket sensor systems.

In some embodiments, the bucket holder 316 is secured with the diaphragm 702 such that the tipping bucket 314 is separated from the diaphragm by a distance. For example, in some applications, the diaphragm 702 comprises one or more tab mountings 710 each configured to receive at least a portion of one or more tabs 602 of the bucket holder 316, and/or the bucket holder may include one or more tab mountings 710 configured to receive at least a portion of a tab of the diaphragm. In some implementations, for example, the bucket holder includes at least one flexible tab 602, and in some instances at least a pair of flexible tabs 602 positioned on opposing sides and each comprising lateral ridges 604, steps, ledges, or the like configured to engage the tab mountings 710 and secure the bucket holder with the diaphragm 702. The diaphragm, in some embodiments, comprises one or more protrusions 812 extending from an upper surface of the diaphragm and each protrusion comprising a recess forming the tab mountings 710 and configured to receive at least a portion of a corresponding and aligned one of the lateral ridges 604 of a corresponding one of the flexible tabs 602. In other implementations, the protrusions 812 may include flexible tabs, lateral ridges, ledges or the like that can mate with recesses and/or holes formed in the bucket holder. In yet other embodiments, the bucket holder may be formed as part of the diaphragm 702.

The bucket holder 316, in some embodiments, includes a pair of pivot posts 608, pegs, bumps, or other such supports extending laterally. Similarly, the tipping bucket includes a pair of pivot apertures 610, cavities, recesses or the like, each configured to mate with a respective one of the pair of pivot posts 608 enabling the tipping bucket to pivot along the tipping axis extending through the pivot posts. In some embodiments, one of the pivot posts is larger than the other, and similarly one of the pivot apertures is larger than the other. This configuration ensures proper assembly, orientation and/or replacement of the tipping bucket. The proper assembly ensures that the trigger 320 is oriented in a correct direction to be accurately detected by the trigger detector 322 as the tipping bucket tips between the first and second positions. In other implementations, the coupling between the bucket holder and the tipping bucket is reversed, with the tipping bucking having the pivot posts and the bucket holder having pivot apertures. In yet other implementations, each of the bucket holder and the tipping bucket may include one of each of a pivot post and a pivot aperture to mate accordingly. This ensures accurate assembly and/or replacement of the tipping bucket. Further, in some embodiments one or both of the tipping bucket and the bucket holder may include pivot ears that extend to position the respective pivot posts and pivot apertures at desired dimensions to provide a separation in distance between the tipping bucket and the bucket holder to provide a desired arch of motion and/or degree of rotation of the tipping bucket to effectively tip the tipping bucket to release the accumulated water.

Figure 10:
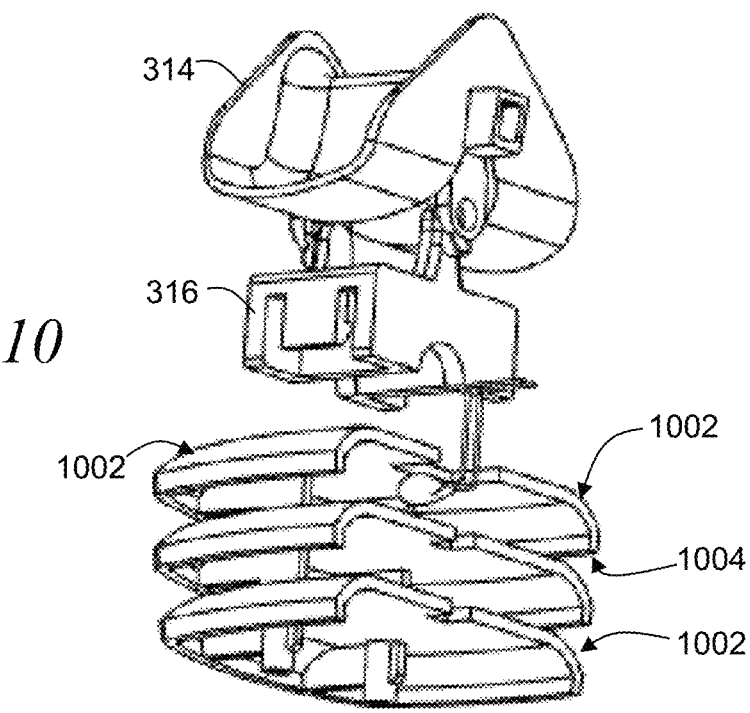
FIG. 10 shows an exposed perspective view of an exemplary set of louvre plates positioned relative to an exemplary temperature sensor and a tipping bucket, in accordance with some embodiments.
Figure 11:
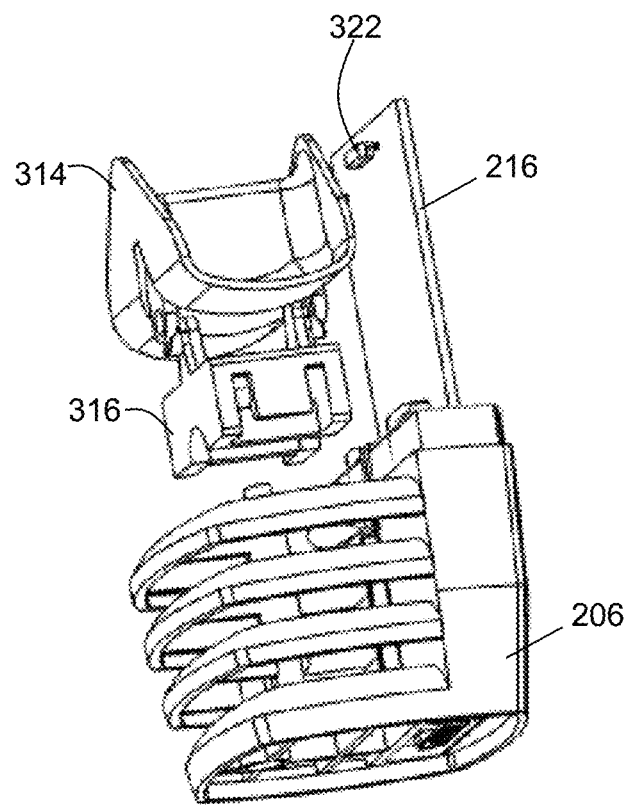
FIG. 11 shows an exposed perspective view of the exemplary set of louvre plates cooperated with a base housing, in accordance with some embodiments.

Further, some embodiments include a set of one or more louvres or louvre plates 214 that provide some additional protection for the temperature sensor 310 from the tipped rain water and adverse weather conditions, while still ensuring the temperature sensor is exposed to ambient temperatures and wind. The set of multiple louvre plates 214 are positioned below the diaphragm 702 and about the temperature sensor. For example, a set of three louvre plates can be stacked with the temperature sensor positioned between the diaphragm and a top most louvre plate. FIG. 10 shows an exposed perspective view of an exemplary set of louvre plates 214 positioned relative to an exemplary temperature sensor 310 and the tipping bucket 314 positioned on the bucket holder 316 (with the diaphragm 702 removed for illustrative purposes), in accordance with some embodiments. FIG. 11 shows an exposed perspective view of the exemplary set of louvre plates 214 positioned relative to an exemplary temperature sensor 310, with the set of louvre plates cooperated with the base housing 206 (with the diaphragm 702 removed for illustrative purposes), in accordance with some embodiments. In some implementations, the set of louvre plates are separate from the base housing and can be cooperated with the base housing, for example, through one or more bolts, rivets, snap-fittings, compression fitting, other such coupling methods or combination of two or more of such coupling methods.

In some embodiments, one or more of the louvre plates is formed with curved perimeter sides 1002 tapering away from the diaphragm 702 and outward from the central axis 326. In some instances, the curved perimeter sides of the top most louvre plate vertically align with the drain apertures 706 of the diaphragm 702 to direct water dropping from the drain apertures out away from the central axis 326 and the temperature sensor 310. Further, each louvre plate can be spaced from the other of the louvre plates establishing air gaps between the louvre plates and exposing the temperature sensor to ambient air while limiting rain water from contacting the temperature sensor. In some embodiments, an upper louvre plate may be positioned with at least a portion of the plate positioned between the temperature sensor 310 and the diaphragm 702, with an exterior lower edge 1004 extending below a plane defined along a bottom of the temperature sensor.

Figure 12:
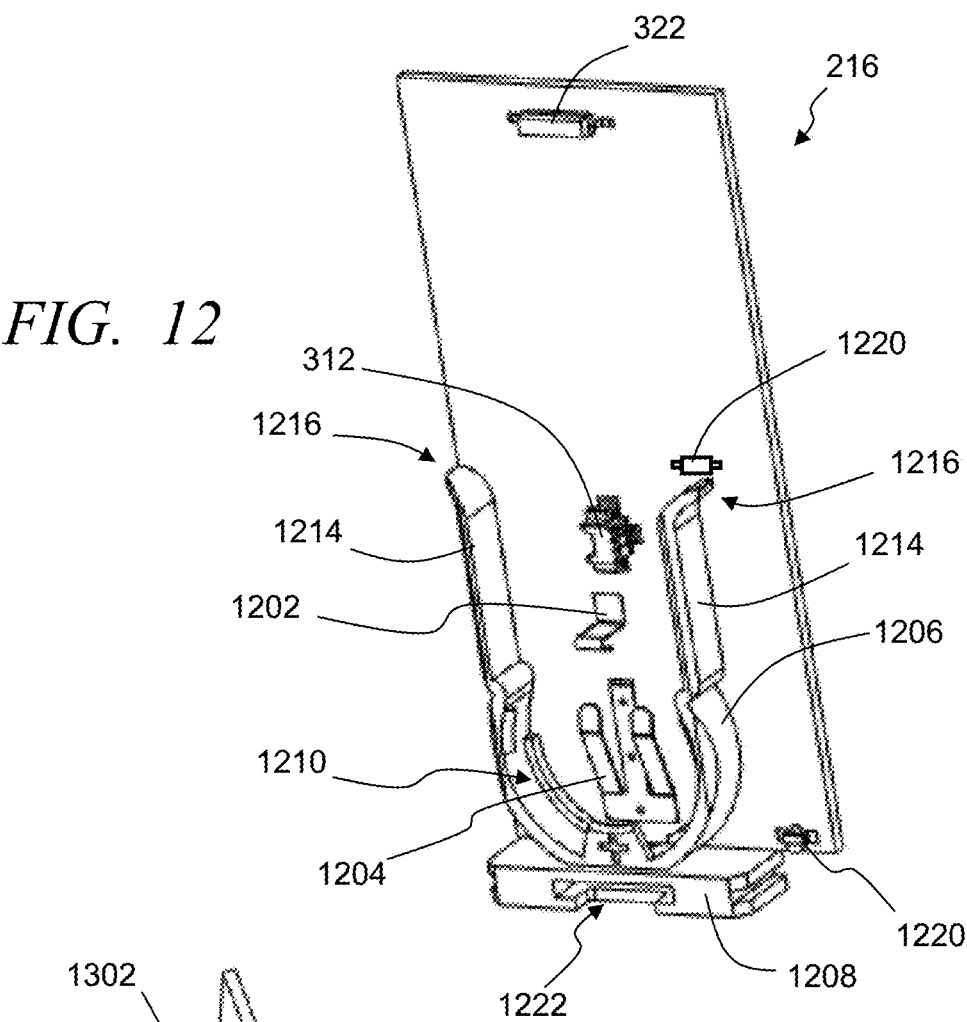
FIG. 12 illustrates a perspective view of an exemplary control board and exemplary power source holder, in accordance with some embodiments.

As illustrated in at least FIGS. 3A and 11, some embodiments include one or more control boards 216 with which at least electrical components of the sensor system 102 are mounted, and in some instances provides electrical coupling (e.g., through metal trace on and/or within the control board) between two or more of the components. For example, the control board may be formed as a printed circuit board (PCB), a mounting board with electrical trace, or other such board. FIG. 12 illustrates a perspective view of an exemplary control board 216 and exemplary power source holder 1206, in accordance with some embodiments. In some implementations, for example, the sensor control circuit 312, the trigger detector 322 and the temperature sensor 310 are coupled to and typically electrically coupled with the control board 216. The control board, in some applications, further includes a power source couplers 1202, 1204 configured to electrically couple with a removable power source (e.g., battery, power cell, etc.) and conduct power from the power source to the one or more components of the sensor system electrically coupled with the control board. In some embodiments, the sensor system 102 includes one or more removable power source holders 1206 that is configured to be removed to allow a power source (e.g., button battery) to be cooperated with the power source holder or replaced, and then reinserted to a predefined position to cause the power source to contact the power source couplers 1202, 1204. The power source holder 1206, in some implementations, includes a holder base 1208, and a power source retaining slot 1210 cooperated with and in some instances extending from the holder base and configured to retain at least one removable power source. In some embodiments, the holder base is configured to cooperate with the base housing 206, and in some instances secure the power source holder 1206 with the base housing. Further, the power source holder 1206, in some applications includes one or more catch arms 1214 with catches 1216 proximate ends distal from the holder base 1208. The catches 1216 can be configured to catch on part of the base housing 206 so that the power source holder 1206 stays in contact with the sensor system after the power source holder is pulled out of the sensor source system providing a user with access to insert and/or replace a power source without the entire power source holder 1206. Further, in some embodiments, at least a portion of the catch arms 1214 are not secured with the control board and are configured to flex at least proximate the catches 1216. As such, a user can apply pressure to the catch arms proximate the catches (e.g., compress the arms together or push the arms apart) to allow the user to disengage the catches 1216 from the base housing 206 and completely remove the power source holder 1206 from the sensor system 102, and similarly return the power source holder to the sensor system.

In some embodiments, one or more indicators 1220 (e.g., lights, LEDs, audio generators, etc.) may be cooperated with the control board 216 and electrically coupled with the power source and/or the sensor control circuit 312. Typically, these indicators are visible and/or audible to a user from an exterior of the sensor system. These indicators can be activated in response to a power source being accurately coupled with the power source couplers 1202, 1204, and/or activated by the sensor control system. The activation and/or deactivation of the indicators provide information to a user regarding one or more operating states of the sensor system. For example, in some implementations an LED 1220 is positioned proximate the holder base 1208 and light from the LED is visible from an exterior of the sensor housing. The holder base 1208 and/or the base housing 206 may, for example, include a lens covered aperture 224 (e.g., see FIG. 2F) allowing the user to see light from the LED. This LED can be activated when a power source is electrically coupled with the powers source couplers 1202, 1204 to notify a user that the power source (and thus the power source holder 1206) is properly installed within the sensor system. Additionally or alternatively, in some embodiments some or all of the power source holder 1206 is formed from an optically propagating light conductive material providing a wave guide. An LED 1220 can be positioned proximate the power source holder (e.g., proximate one of the catches 1216). When the LED is activated, the light from the LED is propagated by the power source holder to cause light to be emitted through some or all of the holder base 1208 and be detected from an exterior of the sensor system by a user.

Figure 13:
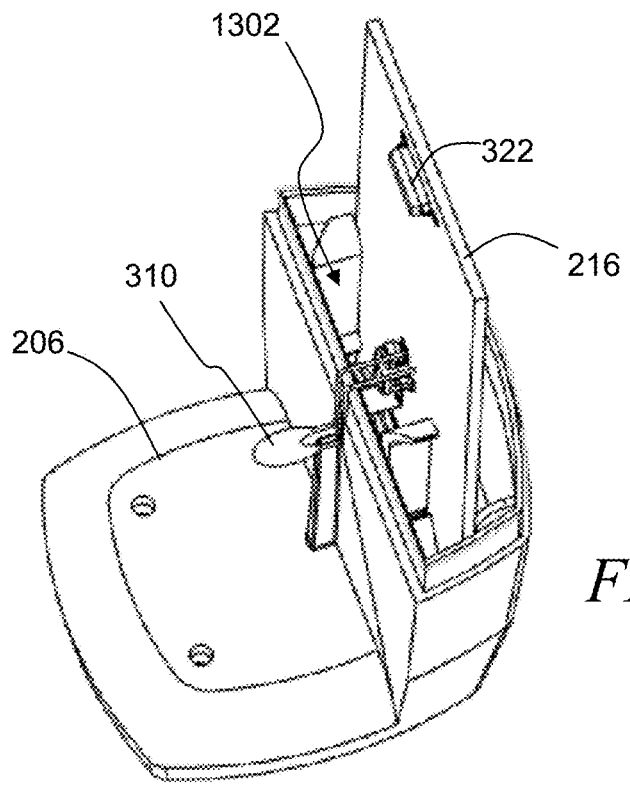
FIG. 13 illustrates a perspective view of an exemplary base housing with a control board cooperated with the base housing, in accordance with some embodiments.

In some embodiments, the sensor system includes a control board cavity 336 configured to receive and hold the control board 216. FIG. 13 illustrates a perspective view of an exemplary base housing 206 with a control board 216 cooperated with the base housing, in accordance with some embodiments. Referring to at least FIGS. 3A, 7-9, 11 and 13, in some applications the control board cavity 336 is separated from a main sensor cavity in which the tipping bucket 314 is maintained to, in part, provide protection for the control board and electrical components cooperated with the control board. For example, in some embodiments, the central housing 204, which is positioned about the tipping bucket 314, includes a first partial control board cavity 802 separated by a first control board cavity wall 804 from the main sensor cavity and the tipping bucket. Similarly, the base housing 206 can include a second partial control board cavity 1302. The base housing 206 is configured to cooperated with the central housing 204 cooperating the first partial control board cavity 802 and the second partial control board cavity 1302 forming the control board cavity. The control board 216 can be mounted within the control board cavity. In some embodiments, leads of the temperature sensor extend through the first control board cavity wall 804 to electrically couple with the control board and/or sensor control circuit.

In some embodiments, the holder base 1208 of the power source holder 1206 is configured to secure with the base housing 206 and close the control board cavity (e.g., see FIG. 2F) while aligning at least one removable power source with the power source couplers, and in some instances provide a water tight seal and sealing the control board cavity. In some implementations, one or more gaskets, ring seals, or the like may be cooperated with the holder base and/or cooperated with a receiving port of the base housing 206 to establish a water tight seal. A "coin" recess 1222 may be formed in the holder base 1208 to receive a portion of a coin, screwdriver, finger nail or other object that can be used by the user to pry out the power source holder 1206.

Figure 14:
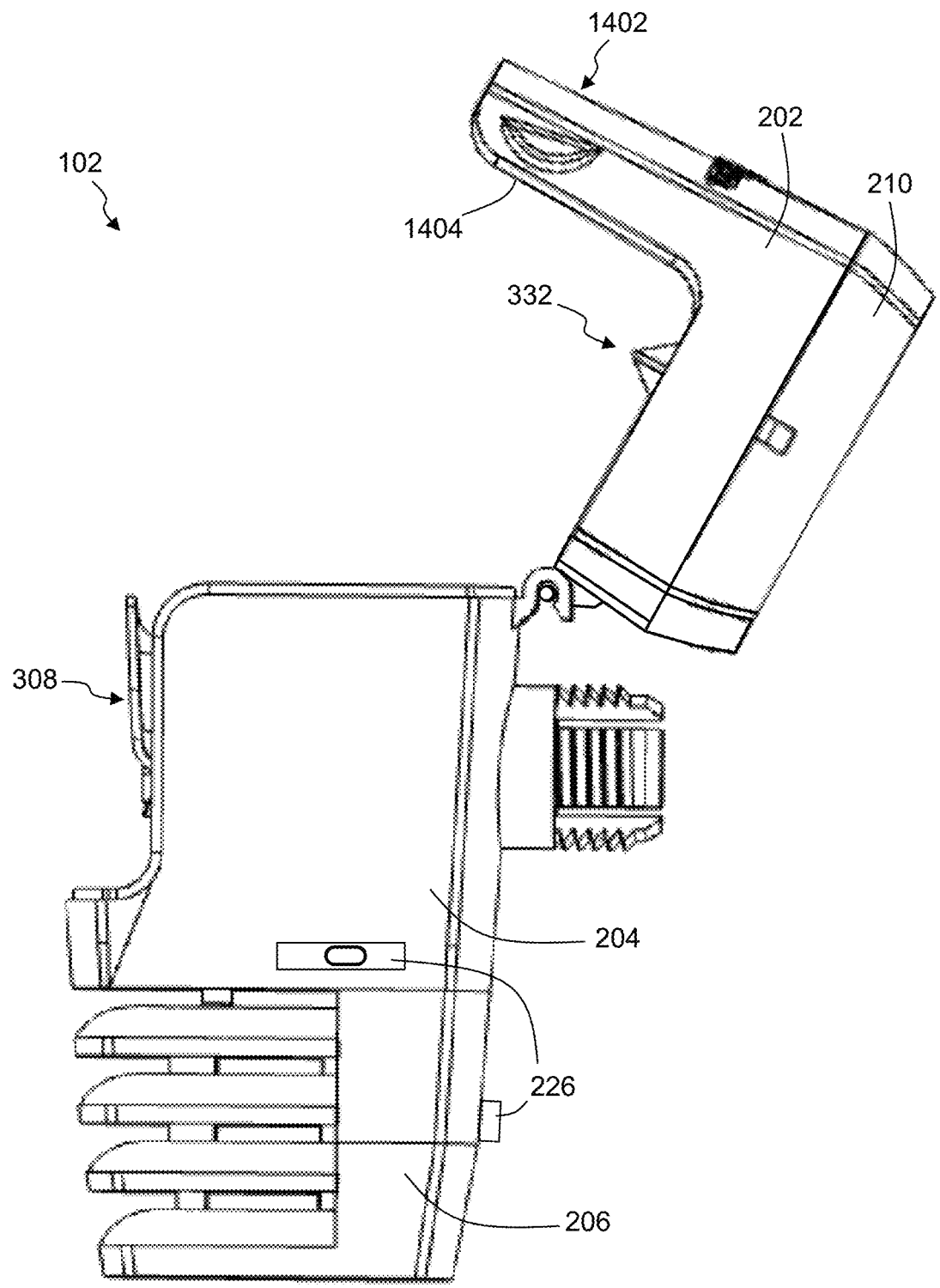
FIG. 14 shows a side view of an exemplary sensor system with the funnel housing opened relative to the central housing, in accordance with some embodiments.

FIG. 14 shows a side view of an exemplary sensor system 102 with the funnel housing 202 opened relative to the central housing 204, in accordance with some embodiments. The sensor system 102 can be configured to allow a user to clean and/or perform other maintenance and repairs to the sensor system. In some embodiments, the funnel housing 202 and/or the debris frame 210 can be removed and/or moved to an open position exposing the interior main sensor cavity and at least the tipping bucket 314. The funnel housing 202 can be hingedly or pivotably coupled with the central housing 204 through one or more snap C-grooves and corresponding rods, hinge loops and pins, and/or other such methods. As such, the pivot coupling provides a clam-shell or jaw opening operation of the funnel housing relative to central housing. This allows the funnel housing to be opened to expose and provide access to the main sensor cavity and at least the tipping bucket 314. With access to the main sensor cavity, a user can clean out the main sensor cavity to remove debris and clean and/or repair the tipping bucket.

Referring to FIGS. 2A-2G, 3A-3D, 7-8 and 14, the funnel housing 202 can rotatably pivot relative to the central housing to pivot the funnel 302 away from the tipping bucket 314 and provide access to an interior of the sensor system including at least access to the tipping bucket. In some embodiments, the central housing 204 comprises an elongated opening 814 at a front surface exposing the tipping bucket 314 and in some instances the bucket holder 316. Similarly, the funnel housing 202 may comprise an extended or elongated opening cover 1402 having dimensions at least equal to and typically greater than the elongated opening 814 such that when the funnel housing is rotated into the closed position the elongated opening cover 1402 covers the elongated opening 814. In some implementations, the central housing 204 may include a recessed lip 816 that is recessed from an exterior surface of the central housing and extending generally parallel with the exterior housing. The recessed lip 816 may extend about the perimeter of the top of opening of the central housing where the central housing is intended to contact the funnel housing 202. The funnel housing may be configured to mate with the recessed lip. In some applications, for example, the funnel housing may include an extended lip 1404 that has a reduced thickness along a portion of the perimeter of lower portions of the funnel housing and configured to mate with the recessed lip 816 of the central housing. Additionally or alternatively, in some embodiments, the elongated opening cover 1402 and/or the elongated opening 814 may include a seal, gasket or the like that limits or prevents rain from entering the central main sensor cavity, defined by the central housing and within which the tipping bucket is positioned, without passing through the funnel and into one of the buckets of the tipping bucket. In some embodiments the funnel housing is pivotably coupled with the central housing to enclose the rain sensor tipping bucket and the temperature sensor.

Further, some embodiments are configured such that the debris frame 210 and debris screen 212 are removable from the funnel housing 202. In some implementations, for example, the debris frame includes tabs 220 that latch, snap into and/or otherwise secure with grooves 222, recesses, apertures, protrusions or the like formed in the funnel housing 202. For example, the tabs 220 may elastically flex when being cooperated with the funnel housing 202 and snap fit with one or more grooves 222, protrusions and/or openings of the funnel housing to secure the debris frame with the funnel housing. The ability to remove the debris frame enables a user to clean the funnel 302, remove debris trapped in the funnel, unclog the lower aperture 306 and perform other such maintenance.

Figure 15:
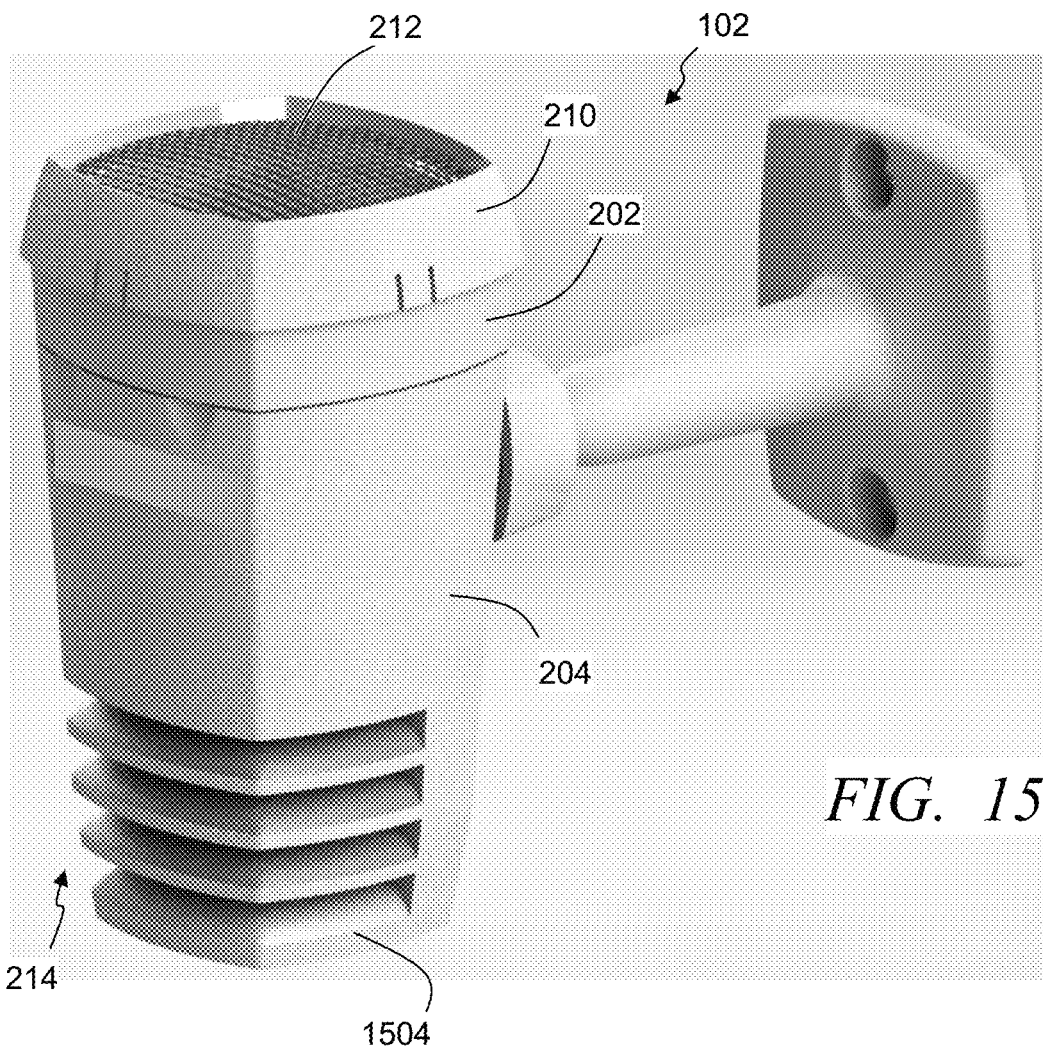
FIG. 15 illustrates an overhead perspective view of an exemplary sensor system, in accordance with some embodiments.
Figure 16:
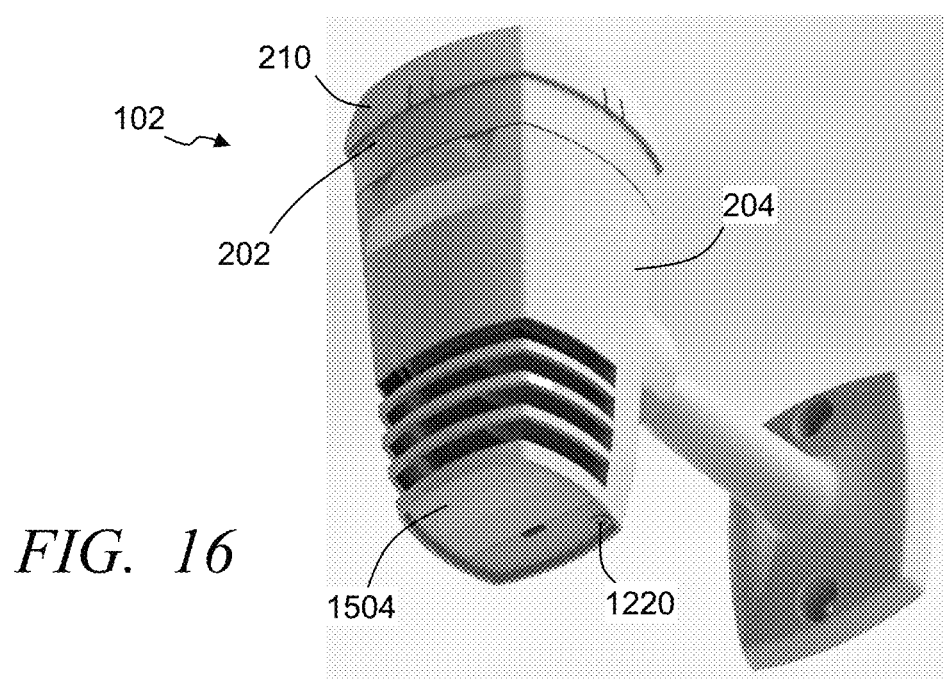
FIG. 16 illustrates a lower perspective view of the exemplary sensor system of FIG. 15, in accordance with some embodiments.

Other embodiments do not include the elongated opening 814 and elongated opening cover 1402. For example, in some embodiments, the funnel housing 202 is level or substantially level at a lower end to mate with a level or substantially level upper end of the central housing 204. FIG. 15 illustrates an overhead perspective view of an exemplary sensor system 102, in accordance with some embodiments. FIG. 16 illustrates a lower perspective view of the exemplary sensor system 102 of FIG. 15, in accordance with some embodiments. The funnel housing 202 snap fits with the central housing 204 through one or more tongue and grooves, flexible taps, compression points, latches, and/or other such methods of securing the funnel housing with the central housing. The dimensions of the funnel housing can be configured to extend low enough along a depth of the main sensor cavity so that once removed a user can readily reach into the main sensor cavity to remove debris (e.g., resting on the diaphragm) and otherwise clean out the main sensor cavity, and/or perform other maintenance of the sensor system.

Further, in some implementations, the sensor system does not include a separate base housing, and instead the central housing extends all the way to the base 1504. Similarly, in some embodiments, the set of louvre plates 214 can be formed as part of the central housing and not detachable from the central housing. For example, in some embodiments, the central housing is formed through injection molding to form as a single continuous piece including the central housing, the base housing, the set of louvre plates, the diaphragm, and the threaded mounting stem. The debris frame may further be configured to readily detach from the funnel housing in response to a threshold pressure and/or upon a user disassociating one or more taps or other such securing structures.

As introduced above, the first and second buckets 402, 404 are configured to collect a predefined accumulated amount of water before the tipping bucket 314 tips. Accordingly, the sensor system is configured to communicate an indication of specific quantities of water detected over time by tracking each tip of the tipping bucket. This is in contrast to other rain sensor systems that utilize one or more hygroscopic disks or other such absorption material that triggers a switch based on an expansion of the disks in response to absorbing water. For example, some other rain sensor systems utilize a sensor that includes a stack of hygroscopic disks that expand when exposed to water and contract when water evaporates away. An electrical signal is produced by a sensor, where the signal corresponds to the amount of expansion of the disks. Such systems, however, typically cannot determine a quantity of rain received, and cannot continue track quantities received once the disks are expanded. Alternatively, the present sensor system 102 utilizes the tipping rain bucket sensor to detect and communicate detected rain signals corresponding to a predefined specific amount of accumulated rain in response to each tipping of the rain bucket.

The controller interface system 104, which is separate from and communicatively coupled with the sensor system 102, receives the rain signals and/or rain data identifying an amount of water received. Further, the sensor system 102 can communicate temperature sensor data that is received at the controller interface system. The controller interface system can determine when a summation of accumulated rain over a threshold period of time is greater than a predefined first accumulated rain threshold. This first accumulated rain threshold may be user specified through a user interface of the controller interface system. In other instances, the first accumulated rain threshold may be set as a default within memory of the controller interface system. The interface control circuit is configured to interrupt activation of the valves when the summation of accumulated rain is greater than the first accumulated rain threshold. Further, the interface control circuit tracks the time of the interruption. In some embodiments, the interface control circuit identifies when a defined first resume irrigation threshold time period has expired since a last of the rain signals is received and/or a time since a last predefined quantity of rain was detected by the sensor system. The first resume irrigation threshold time period may be user defined, defined within memory of the controller interface system (e.g., based on duration of rain, quantity of rain, other such factors, or combination of such factors), or the like. When the defined first resume irrigation threshold time period has expired the interface control circuit is configured to remove the interruption of the activation of the valves to allow further activation of the valves by the irrigation controller. This can include, for example, closing a switch to close the common line 122. In some embodiments, the interface control circuit in removing the interruption is configured to identify that the first resume irrigation threshold period of time is to be used from a set of multiple resume irrigation threshold periods as a function of a total amount of accumulation of rain detected and a duration of the accumulation.

Figure 17:
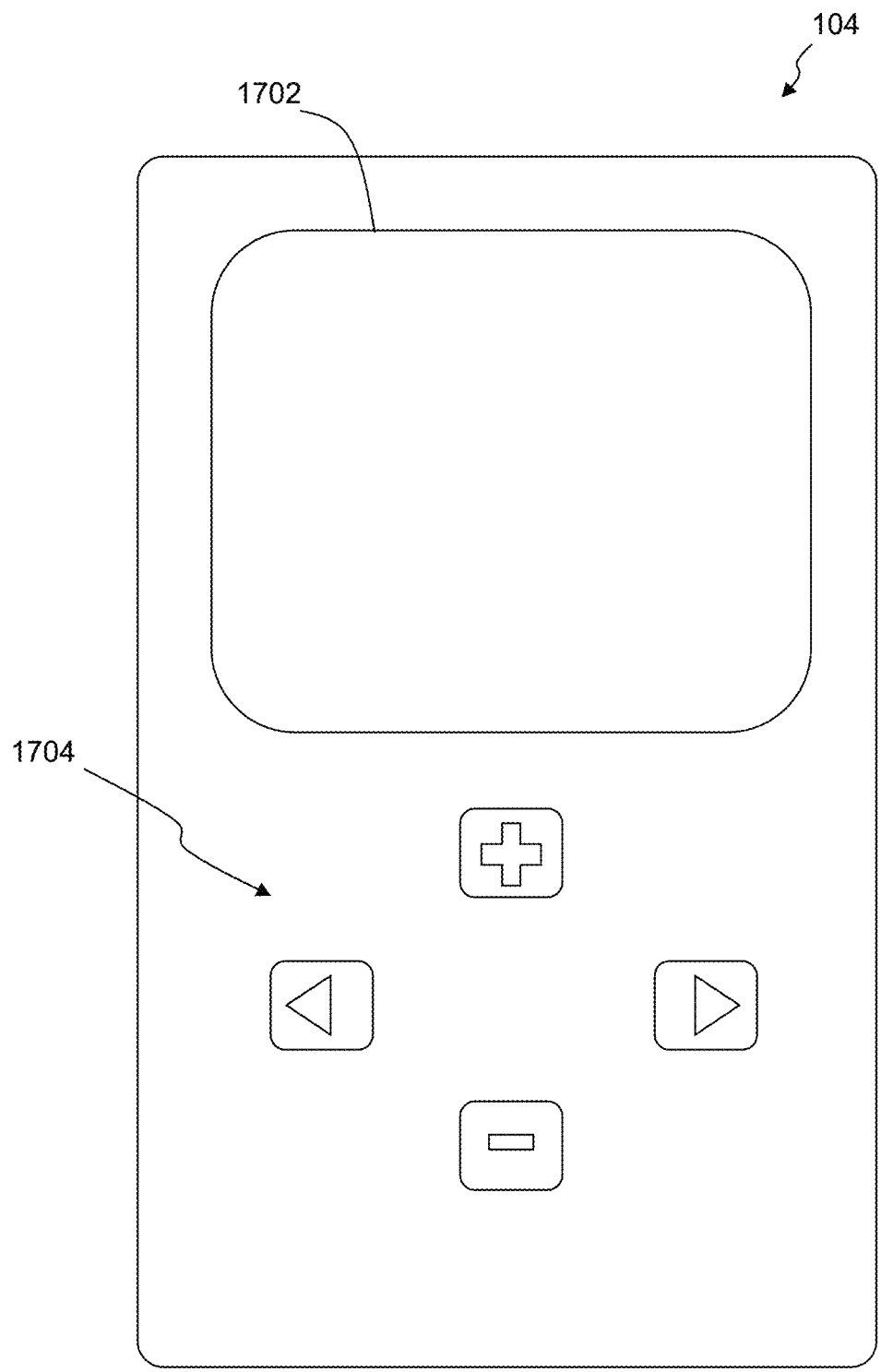
FIG. 17 illustrates a simplified view of an exemplary controller interface system, in accordance with some embodiments.
Figure 18A:
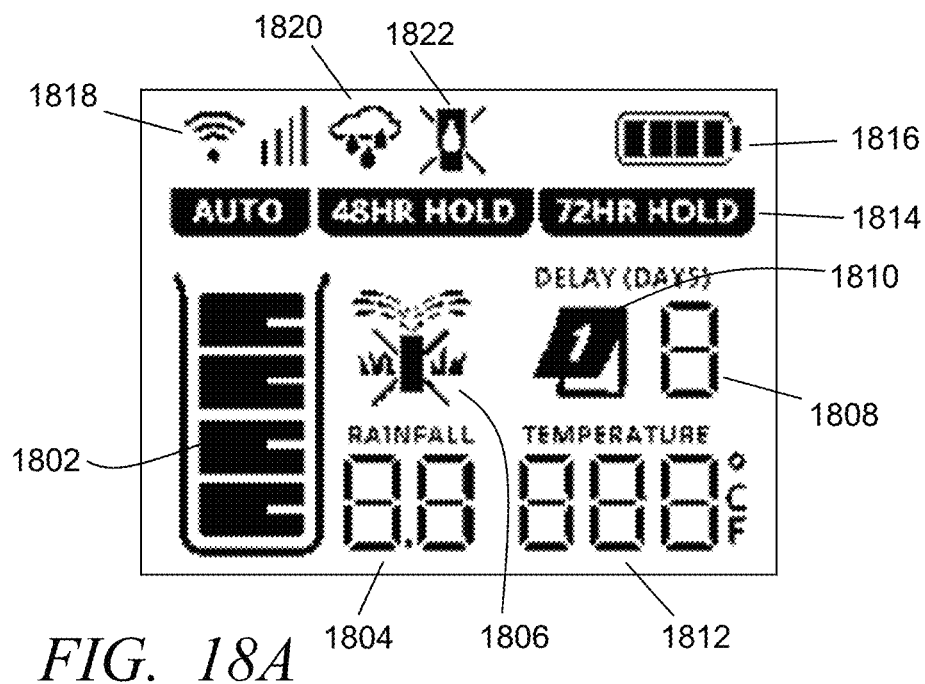
FIGS. 18A-18H illustrate simplified representations of user interfaces 1800 that can be utilized with the controller interface system, in accordance with some embodiments.
Figure 18B:
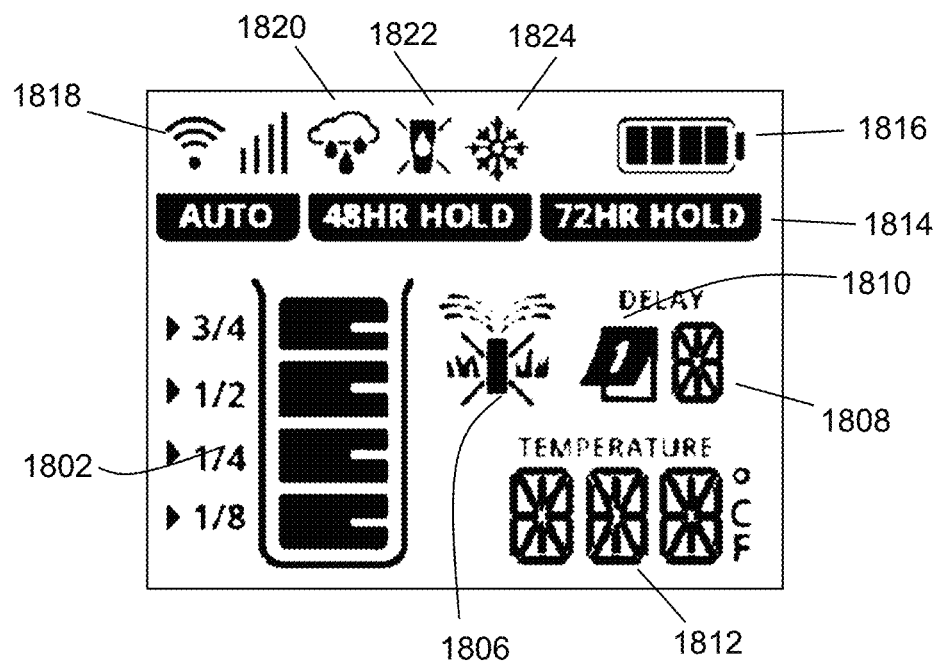

In some embodiments, the control interface system 104 includes a user interface that allows the user to enter parameters into the controller interface system and/or obtain information from the controller interface system. FIG. 17 illustrates a simplified view of an exemplary controller interface system 104, in accordance with some embodiments. The controller interface includes a user interface comprising one or more displays 1702, and user inputs 1704 (e.g., buttons, touch screen, trackball, etc.). FIG. 18A illustrates a simplified representation of a user interface 1800 that can be utilized with the controller interface system 104, in accordance with some embodiments. Typically, all of the information represented is not displayed at the same time, and instead is illustrated to provide representative examples of the type of information that may be presented and how the information may be presented (e.g., textual, pictorial, etc.). In the example of FIG. 18A, the information may correspond to rain information with a pictorial representation of a quantity of water detected 1802, numeric quantity of rain 1804 (e.g., in inches or metric), whether irrigation is interrupted 1806, number of days to delay irrigation 1808, a current day during the delay 1810, a current temperature and/or setting a threshold temperature 1812, whether there is a hold to override the sensor 1814 (e.g., 48 hr. hold, 72 hr. hold), a pictorial representation of remaining battery power 1816, wireless communication strength 1818, pictorial representation of rain status 1820, and interruption indicator due to rain 1822. FIG. 18B illustrates additional or alternative representation of information provided through the user interface. In some instances, for example, the display may depict a pictorial representation of a quantity of water detected and/or quantity of water relative to a threshold 1802, whether irrigation is interrupted 1806, number of days to delay irrigation 1808, a current day during the delay 1810, a current temperature and/or setting a threshold temperature 1812, whether there is a hold to override the sensor 1814 (e.g., 48 hr. hold, 72 hr. hold), a pictorial representation of remaining battery power 1816, wireless communication strength 1818, pictorial representation of rain status 1820, interruption indicator due to rain 1822, and/or an interruption indicator due to temperature 1824.

Figure 18C:
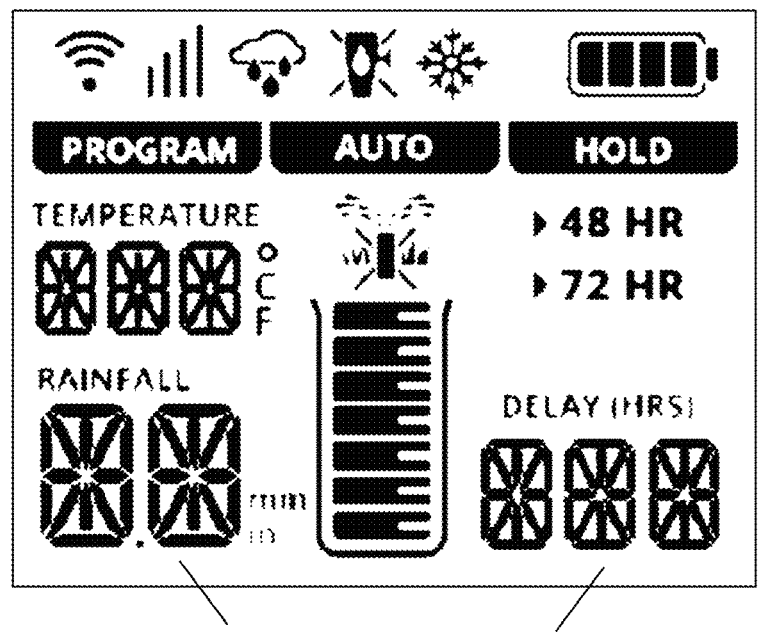
Figure 18D:
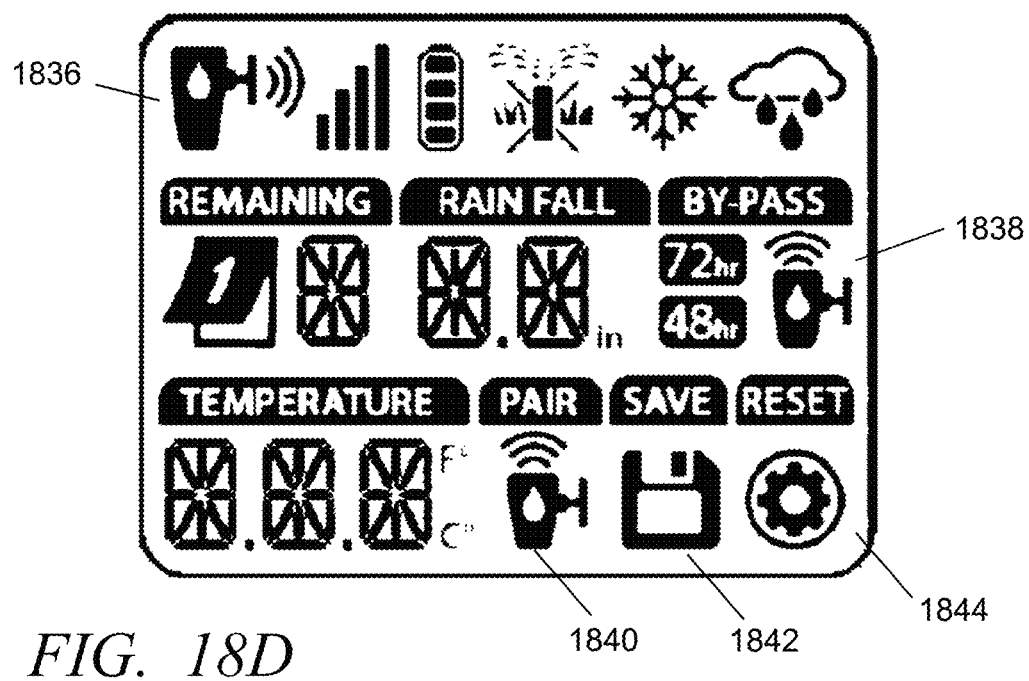
Figure 18E:
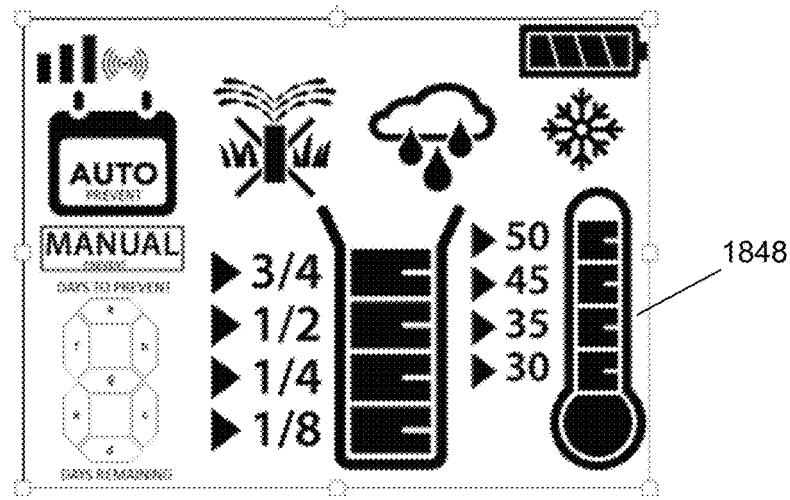
Figure 18F:
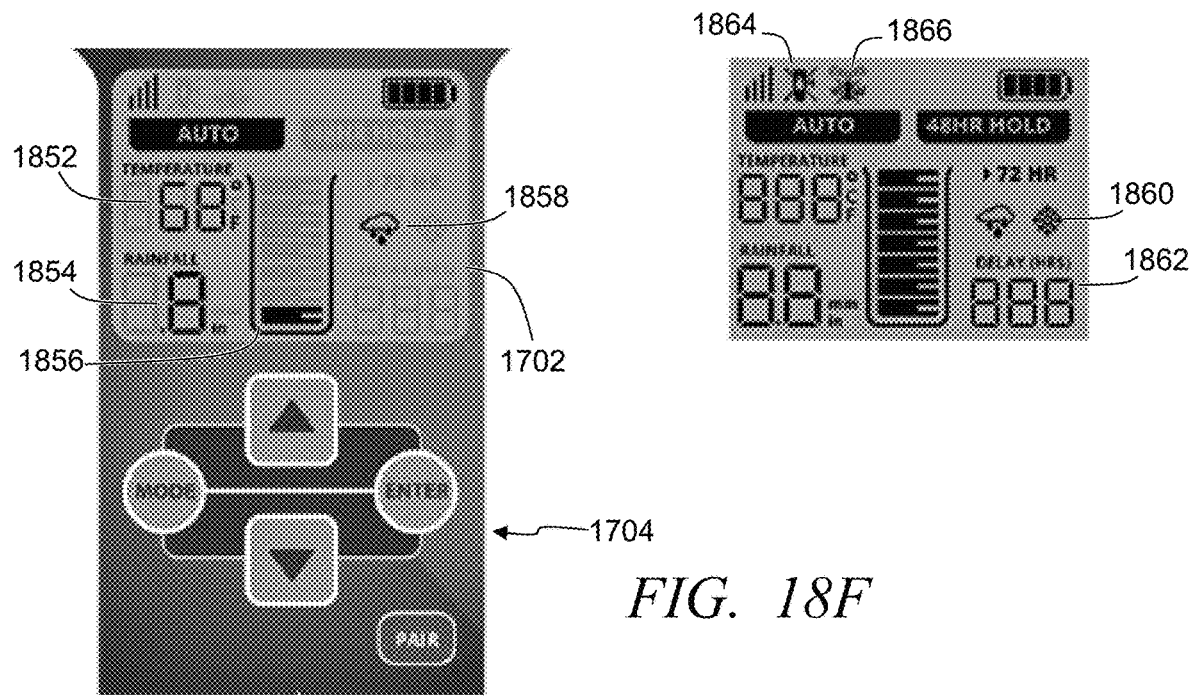
Figure 18G:
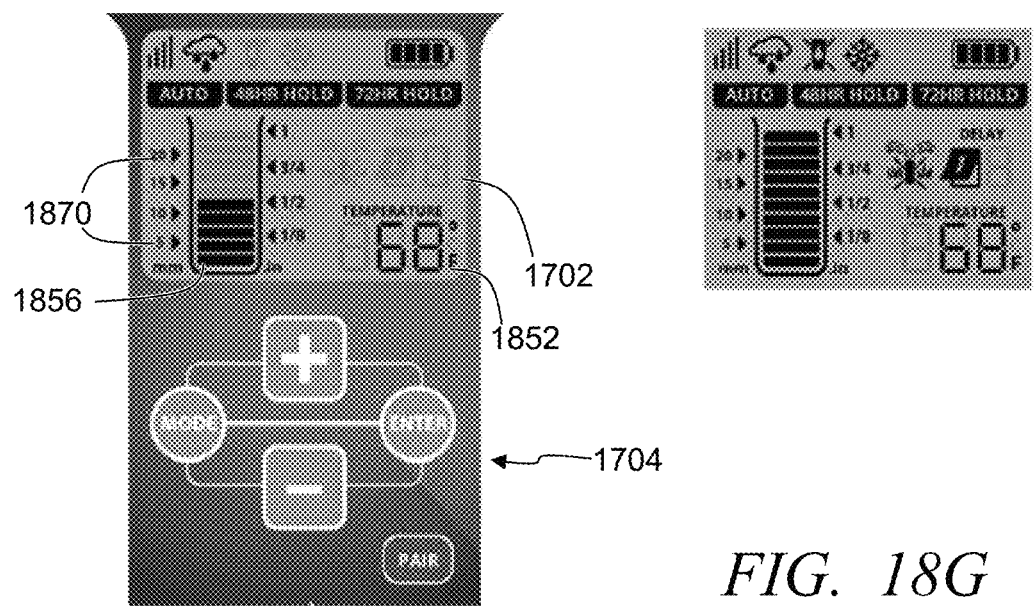
Figure 18H:
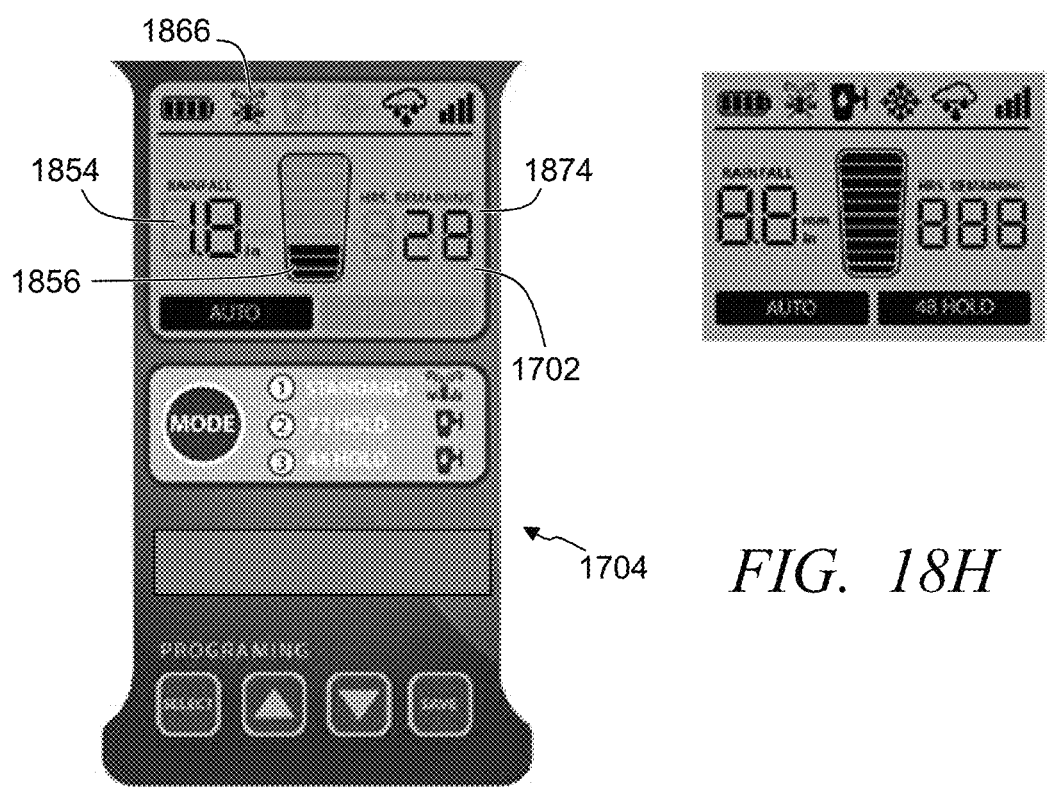

FIG. 18C illustrates an interface allowing a user to set a minimum rainfall before interruption is to occur 1830, and interruption delays in hours 1832. FIG. 18D illustrates an exemplary representation of a displayed user interface providing status information, such as but not limited to pairing 1836 between controller interface system 104 and a sensor system 102, whether to bypass interruption 1838, reactivating a pairing process 1840, saving data 1842, resetting settings 1844, and/or other such information. FIG. 18E illustrates another representative user interface display that additionally includes a pictorial representation of a current temperature 1848 and potential set temperature thresholds. FIG. 18F illustrates a simplified representation of a controller interface system 104 with a user interface that includes user inputs 1704 and a display 1702, in accordance with some embodiments. In this representation, the user interface is displaying relevant numeric information about current temperature 1852, a numeric indication of a quantity of detected rainfall 1854 (e.g., "0.8 in"), a pictorial representation of an indication that rain is being detected 1856, and a pictorial representation of a quantity of water detected 1858. FIG. 18F further illustrates other potential alphanumeric and pictorial representations that be displayed to the user (e.g., an indication of irrigation delay 1860, pictorial representation that irrigation is interrupted because of temperature 1862, an indication that there is no communication connection with the sensor system 1864, that irrigation interrupted 1866, and the like). FIG. 18G illustrates a simplified representation of a controller interface system 104 with a user interface that includes user inputs 1704 and a display 1702, in accordance with some embodiments. In this representation, the user interface is displaying a pictorial representation of an indication of a quantity of rain detected 1856 and one or more rain thresholds 1870, and an indication of a current temperature 1852. FIG. 18G further illustrates other potential alphanumeric and/or pictorial information similar to those described above in accordance with some implementations and/or states of operation. FIG. 18H illustrates a simplified representation of a controller interface system 104 with a user interface that includes user inputs 1704 and a display 1702, in accordance with some embodiments. In this representation, the user interface is displaying a pictorial representation of an indication of a quantity of rain detected 1856, a pictorial indication that irrigation is interrupted 1866, and an estimated duration of time remaining before an interrupt is removed 1874 and one or more rain thresholds 1870, and an indication of a current temperature 1852. FIG. 18G further illustrates other potential alphanumeric and/or pictorial information similar to those described above in accordance with some implementations and/or states of operation.

Figure 19:
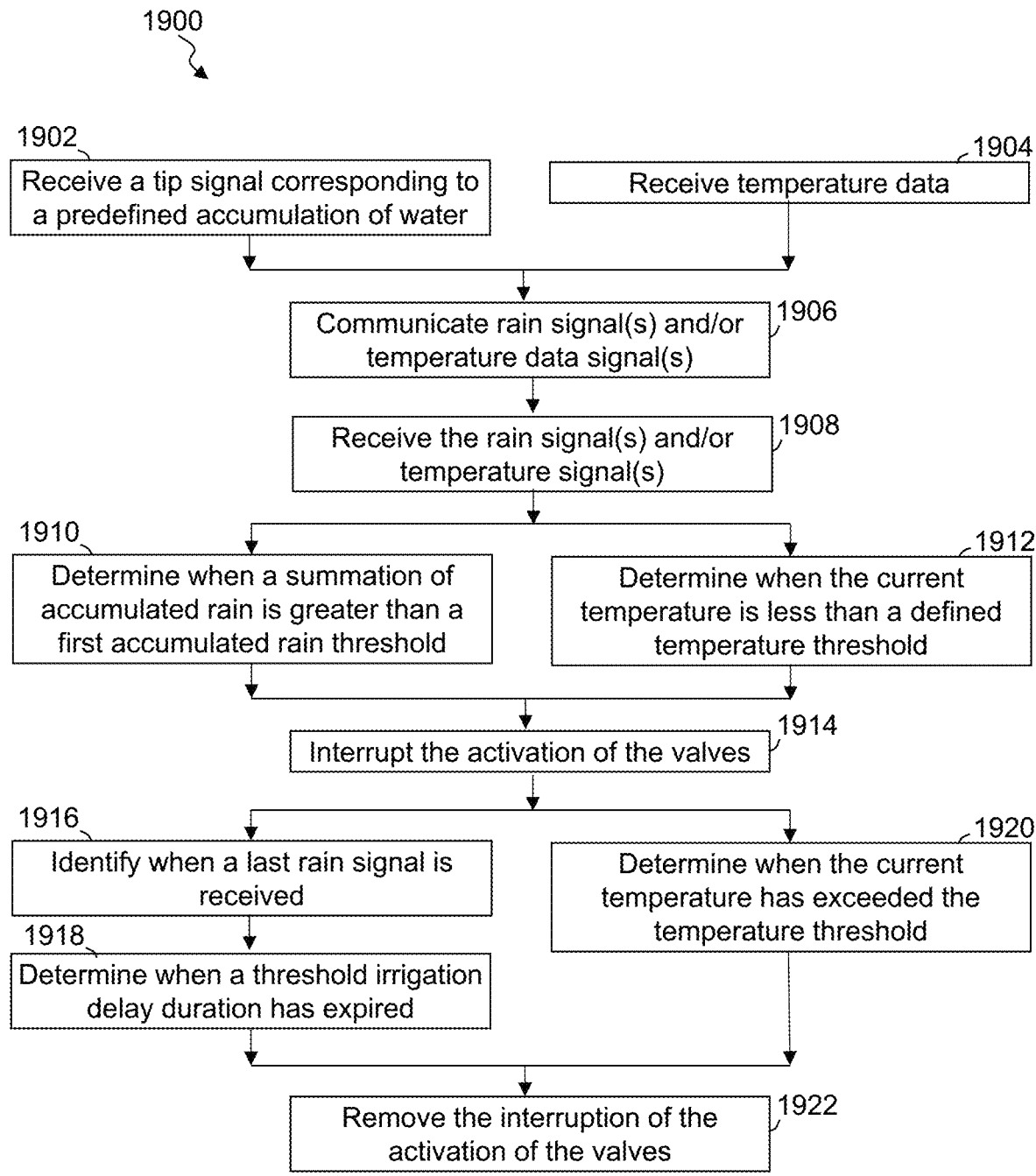
FIG. 19 illustrates a simplified flow diagram of an exemplary process of controlling irrigation through an external interrupt, in accordance with some embodiments.

FIG. 19 illustrates a simplified flow diagram of an exemplary process 1900 of controlling irrigation through an external interrupt, in accordance with some embodiments. In step 1902, the sensor control circuit 312 receives a tip signal corresponding to a predefined accumulation of water. In step 1904, the sensor control circuit additionally or alternatively receives temperature data from the temperature sensor 310. In step 1906, one or more rain signals and/or one or more temperature data signals is communicated to the controller interface system 104. Typically, the rain signal is wirelessly communicated.

In step 1908, the interface control circuit 116 receives the communicated rain signal corresponding to an amount of accumulated rain in response to each tipping of the rain sensor and/or one or more temperature data signals. In step 1910, the interface control circuit determines when a summation of accumulated rain over a first threshold period of time is greater than a user defined and/or one or more system defined first accumulated rain threshold. Additionally or alternatively, in step 1912, the interface control circuit determines when the current ambient temperature is less than a user defined and/or one or more system defined temperature threshold.

In step 1914, the activation of the valves is interrupted when one or both the summation of accumulated rain is greater than the first accumulated rain threshold and/or the current ambient temperature is less than the temperature threshold. In step 1916, it is identified when a last rain signal is received relative to a threshold period of time. In step 1918 it is determined when a threshold irrigation delay duration has expired since the last rain signal is received. In some embodiments the user can set a threshold irrigation delay duration to apply following a rain event. For example, the interface control circuit may identify when a user defined first resume irrigation threshold time period has expired since a last of the rain signals is received. This delay allows the plant life to utilize the rain water instead of receiving further irrigation water. Additionally or alternatively, the controller interface system may determine a threshold irrigation delay to apply based on a duration and/or a quantity of water received during one or more irrigation events. In step 1920 it is determined when the current temperature has exceeded the temperature threshold. In step 1922, the interruption of the activation of the valves is removed to allow further activation of the valves by the irrigation controller.

Figure 20:
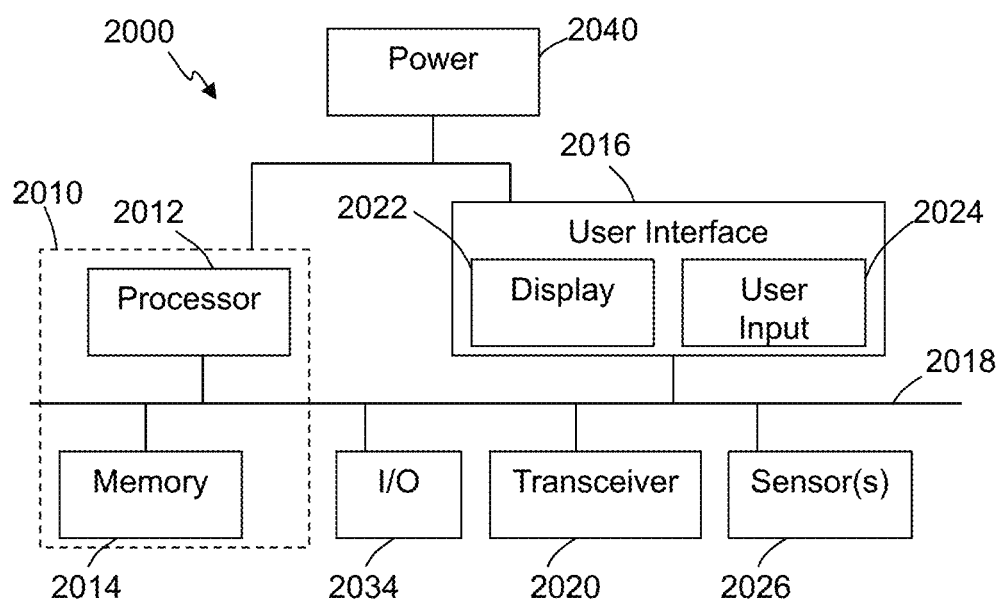
FIG. 20 illustrates an exemplary system for use in implementing methods, techniques, circuits, systems, devices, apparatuses, servers and sources, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 20 illustrates an exemplary system 2000 that may be used for implementing any of the components, circuits, circuitry, systems, functionality, apparatuses, processes, or devices of the sensor system 102, the controller interface system 104, the irrigation controller 106, control circuits, and/or other above or below mentioned systems, circuits or devices, or parts of such circuits, circuitry, functionality, systems, apparatuses, processes, or devices. However, the use of the system 2000 or any portion thereof is certainly not required.

By way of example, the system 2000 may comprise a control circuit or processor module 2012, memory 2014, and one or more communication links, paths, buses or the like 2018. Some embodiments may include one or more user interface 2016, and/or one or more internal and/or external power sources or supplies 2040. The control circuit 2012 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 2012 can be part of control circuitry and/or a control system 2010, which may be implemented through one or more processors with access to one or more memory 2014 that can store instructions, code and the like that is implemented by the control circuit and/or processors to implement intended functionality. Again, the system 2000 may be used to implement one or more of the above or below, or parts of, components, circuits, systems, processes and the like. For example, the system may implement the sensor system 102 with the control circuit 2012 being a sensor control circuit 312, the controller interface system with the control circuit 2012 being an interface control circuit 116, the irrigation controller 106 with an irrigation control circuit 112, or other components.

The user interface 2016 can allow a user to interact with the system 2000 and receive information through the system. In some instances, the user interface 2016 includes a display 2022 and/or one or more user inputs 2024, such as buttons, touch screen, track ball, keyboard, mouse, etc., which can be part of or wired or wirelessly coupled with the system 2000. Typically, the system 2000 further includes one or more communication interfaces, ports, transceivers 2020 and the like allowing the system 2000 to wired and/or wirelessly communicate over a communication link (e.g., Wi-Fi, Bluetooth, cellular, etc.), bus, a distributed computer and/or communication network (e.g., a local area network (LAN), the Internet, wide area network (WAN), etc.), communication link 2018, other networks or communication channels with other devices and/or other such communications or combination of two or more of such communication methods. Further the transceiver 2020 can be configured for wired, wireless, optical, fiber optical cable, satellite, or other such communication configurations or combinations of two or more of such communications. Some embodiments include one or more input/output (I/O) ports 2034 that allow one or more devices to couple with the system 2000. The I/O ports can be substantially any relevant port or combinations of ports, such as but not limited to USB, Ethernet, or other such ports. The I/O interface 2034 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The system 2000 comprises an example of a control and/or processor-based system with the control circuit 2012. Again, the control circuit 2012 can be implemented through one or more processors, controllers, central processing units, logic, software and the like. Further, in some implementations the control circuit 2012 may provide multiprocessor functionality.

The memory 2014, which can be accessed by the control circuit 2012, typically includes one or more processor readable and/or computer readable media accessed by at least the control circuit 2012, and can include volatile and/or non-volatile media, such as RAM, ROM, EEPROM, flash memory and/or other memory technology. Further, the memory 2014 is shown as internal to the control system 2010; however, the memory 2014 can be internal, external or a combination of internal and external memory. Similarly, some or all of the memory 2014 can be internal, external or a combination of internal and external memory of the control circuit 2012. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over a computer network. The memory 2014 can store code, software, executables, scripts, data, content, lists, programming, programs, log or history data, user information, customer information, product information, and the like. While FIG. 20 illustrates the various components being coupled together via a bus, it is understood that the various components may actually be coupled to the control circuit and/or one or more other components directly.

In some embodiments, the system utilizes a tipping rain bucket based rainfall accumulation sensor within a size profile considerably smaller than known tipping rain bucket sensors. The controller interface system applies interrupt or cutoff algorithms to identify when to interrupt and when to resume irrigation based on the wirelessly received rainfall measurements from the tipping rain bucket-based sensor and/or the temperature sensor. The sensor system is configured to allow rain to enter the funnel that directs the captured rain to fill a first bucket of a tipping bucket resting on a pivot or tipping axis. When the first bucket is filled to a predefined accumulated quantity, the tipping bucket tips about the tipping axis and the water spills out of the first bucket, and subsequent rain water is funneled into a second bucket of the tipping bucket. When the second bucket is filled with the predefined accumulation of water, the tipping bucket again tips causing the water in the second bucket to spill out. In some implementations, the tipping bucket is off center from the apertures of the funnel providing a more efficient use of space and allowing the sensor system to be smaller. Every time the tipping bucket tips it is detected by the trigger detector (e.g., magnetic switch), and a pulse is outputted to the sensor control circuit. In some instances, the sensor control circuit causes a tip signal to be communicated to the controller interface system in response to each tip of the tipping bucket. In other instances, the sensor control circuit tracks a number of tips and communicates a signal corresponding to the sum of the number of tips. The number of tips and/or signals over time indicate the amount of received rainfall over time. The sensor system communicates the number of tip pulses received over time and/or outputs a wireless signal for every pulse that is counted as it occurs. Further, the sensor system is configured to protect the temperature sensor from the water tipped from the rain bucket.

In some embodiments, the sensor system 102 is battery powered and includes the tipping rain bucket components, a thermistor-based temperature sensor, the sensor control circuit, which may be implemented through one or more microcontrollers, and a wireless transceiver. The sensor system may be implemented with a jaw or hinged funnel housing that is pivoted open to allow access to at least some of the internal components including the sensor system, including the tipping bucket that tips either way about a pivot axis. Water enters the sensor system though a mesh debris screen or at the top, is directed by the funnel to the aperture and drips into one of the two buckets of the tipping bucket 314. Again, in some embodiments, a longitudinal central axis of the tipping bucket is out of alignment with the aperture to improve the use of space and in part reduce the size of the sensor system. When the tipping bucket tips too much in one direction, the water spills out of one bucket, and the other bucket beings to fill until that bucket begins accumulates the predefined threshold amount and the tipping bucket again tips the other direction. The excess water flows out over a diaphragm 702 that directs the water out of drain apertures and over louvres 214 and away from the sensor system (e.g., down to the ground). The diaphragm guides the water away from a temperature sensor 310 positioned directly underneath the tipping bucket 314. The louvres serve to allow air flow for accurate temperature readings by the temperature sensor. The pivotable opening of the funnel housing allows easy access to the internal components to inspect, service and/or easily replace of components. Additionally, in some implementations, the tipping bucket is offset from the aperture 306 and funnel 302.

Relative to disk based sensor, the sensor system 102 is considerably more accurate in terms of accumulation measurements and; thus, provides the controller interface system 104 with a finer resolution and accuracy on the accumulation levels of rainfall. The controller interface system 104 processes the received signals and determines whether to interrupt irrigation based on user entered adjustable accumulation thresholds and/or temperature thresholds, and when to resume irrigation (remove the interruption) based on a resumption delay threshold. In some embodiments, the controller interface system causes an interruption when the accumulated amount of water within a given time period exceeds the user defined threshold.

The controller interface system may remove the interruption to resume irrigation automatically after expiration of a period of time (e.g., 48 hours) after detecting the stopping of rain (e.g., detecting no further bucket movement over a threshold period of time). This is in contrast to waiting a period of time after the start of rainfall since it is unknown how long the rainfall will last. It is further in contrast to resuming when it is determined that the accumulation has fallen back to a certain level of accumulation. The controller interface system can determine to release the interruption automatically at different points depending on the amount of accumulation and the time duration of the accumulation. In some implementations, the user uses a user interface of the controller interface system to further define the technique used to determine the resumption of irrigation and/or adjust a resumption threshold at the controller interface system.

Some embodiments provide an irrigation sensor system, comprising: a rain funnel comprising an upper opening and at least one wall tapering from the upper opening to a lower aperture; and a tipping bucket positioned to receive water falling from the lower aperture while the tipping bucket is positioned such that a central longitudinal axis of the tipping bucket is not aligned with an axis extending through the lower aperture of the funnel.

Further, some embodiments provide an external irrigation interruption system, comprising: a rain funnel comprising an upper opening and at least one wall tapering from the upper opening to a lower aperture; a tipping rain bucket sensor comprising: a tipping bucket positioned aligned with the lower aperture of the funnel and comprising a first rain bucket, a second rain bucket positioned adjacent the first rain bucket and an extended wall extending away from and between the first and second rain buckets to alternately align a first face extending from the first rain bucket and a second face extending from the second rain bucket with the lower aperture; a bucket holder, wherein the tipping bucket is pivotably secured with the bucket holder enabling the tipping bucket to transition between a first position with the first face of the extended wall aligned with the aperture to direct water into the first rain bucket and a second position with the second face of the extended wall aligned with the aperture to direct water into the second rain bucket; and a trigger secured relative to the extended wall to transition between a first station when the tipping bucket is in the first position, and a second station when the tipping bucket is in the second position; a temperature sensor positioned below the rain sensor and vertically aligned with at least a portion of the tipping bucket; a protection diaphragm positioned between the rain sensor and the temperature sensor, and comprising water disbursement plate and a plurality of drain apertures, wherein the water disbursement plate extends over the temperature sensor and to the plurality of drain apertures causing rain water released by the first rain bucket and the second rain bucket to drain through the drain apertures away from the temperature sensor; a trigger detector positioned relative to the trigger and configured to activate in response to the trigger passing within a threshold distance of the trigger detector and output a tip signal; a communication transceiver; and a sensor control circuit communicatively coupled with the trigger detector and the transceiver, wherein the sensor control circuit is configured to receive the tip signals and cause the transceiver to transmit rain signals corresponding to a predefined amount of accumulated rain in response to the tipping of the tipping bucket.

Some embodiments provide irrigation interruption systems, comprising: a sensor system comprising a sensor control circuit, a tipping rain bucket sensor and a temperature sensor wherein the rain sensor is configured to communicate rain signals corresponding to an amount of accumulated rain in response to each tipping of the rain sensor; an override controller interface system separate from and communicatively coupled with the sensor system, and comprising an interface control circuit; and an irrigation controller separate from the sensor system and the controller interface system, and comprising an irrigation control circuit, a set of activator output couplers configured to couple to remote irrigation valves, and memory coupled to the irrigation control circuit and configured to store a watering schedule to be executed by the irrigation control circuit and that defines when to turn on and off the irrigation valves; wherein the interface control circuit is configured to receive the rain signals and temperature sensor data from the sensor system, determine when a summation of accumulated rain over a first threshold period of time is greater than a user defined first accumulated rain threshold, interrupt activation of the valves when the summation of accumulated rain is greater than the first accumulated rain threshold, identify when a user defined first resume irrigation threshold time period has expired since a last of the rain signals is received, and remove the interruption of the activation of the valves to allow further activation of the valves by the irrigation controller.

Some embodiments provide methods of controlling irrigation through an external interrupt, comprising: receiving a tip signal from a tipping bucket corresponding to a predefined accumulation of water; communicating one or more rain signals to a separate controller interface system that is separate from an irrigation controller that is activating irrigation valves; receiving, and the controller interface system, the communicated rain signal corresponding to an amount of accumulated rain; determining when a summation of accumulated rain over a first threshold period of time is greater than a defined first accumulated rain threshold; interrupting the activation of the valves when the summation of accumulated rain is greater than the first accumulated rain threshold; identifying when a last rain signal is received relative to a threshold period of time; determining when a threshold irrigation delay duration has expired since the last rain signal is received; and removing the interruption of the activation of the valves when the threshold irrigation delay duration has expired since the last rain signal is received.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An external irrigation interruption system, comprising:
    a rain funnel comprising an upper opening and at least one wall tapering from the upper opening to a lower aperture;
    a tipping rain bucket sensor comprising:
        a tipping bucket positioned aligned with the lower aperture of the funnel and comprising a first rain bucket, a second rain bucket positioned adjacent the first rain bucket and an extended wall extending away from and between the first and second rain buckets to alternately align a first face extending from the first rain bucket and a second face extending from the second rain bucket with the lower aperture;
        a bucket holder, wherein the tipping bucket is pivotably secured with the bucket holder enabling the tipping bucket to transition between a first position with the first face of the extended wall aligned with the aperture to direct water into the first rain bucket and a second position with the second face of the extended wall aligned with the aperture to direct water into the second rain bucket; and
        a trigger secured relative to the extended wall to transition between a first station when the tipping bucket is in the first position, and a second station when the tipping bucket is in the second position;
    a temperature sensor positioned below the rain sensor and vertically aligned with at least a portion of the tipping bucket;
    a protection diaphragm positioned between the tipping rain bucket sensor and the temperature sensor, and comprising a water disbursement plate and a plurality of drain apertures, wherein the water disbursement plate extends over the temperature sensor and to the plurality of drain apertures causing rain water released by the first rain bucket and the second rain bucket to drain through the drain apertures away from the temperature sensor;
    a trigger detector positioned relative to the trigger and configured to activate in response to the trigger passing within a threshold distance of the trigger detector and output a tip signal;
    a communication transceiver; and a sensor control circuit communicatively coupled with the trigger detector and the transceiver, wherein the sensor control circuit is configured to receive the tip signals and cause the transceiver to transmit rain signals corresponding to a predefined amount of accumulated rain in response to the tipping of the tipping bucket.

2. The system of claim 1, wherein the tipping bucket is positioned such that a central longitudinal axis of the tipping bucket, which is perpendicular to an axis about which the tipping bucket tips, is not aligned with the lower aperture of the funnel.

3. The system of claim 1, wherein the funnel comprises a drip extension extending from the lower aperture, wherein an end of the drip extension is positioned at least level with upper edges of opposing side walls of the tipping bucket extending from the extended wall.

4. The system of claim 1, wherein the funnel comprises a drip extension extending from the lower aperture, wherein the end of the drip extension is positioned to be within a threshold vertical separation distance from upper edges of opposing side walls of the tipping bucket, wherein the threshold vertical separation distance is proportional to a lateral distance (X) between the end of the drip extension and the upper edge of the opposing side walls and a threshold tilt angle from vertical.

5. The system of claim 1, further comprising:
a set of multiple louvre plates positioned below the diaphragm and about the temperature sensor, wherein each louvre plate comprises curved perimeter sides tapering away from the diaphragm and outward from the central axis, and each louvre plate is spaced from the other of the louvre plates establishing air gaps between the louvre plates and exposing the temperature sensor to ambient air while limiting rain water from contacting the temperature sensor.

6. The system of claim 1, further comprising:
a central housing positioned about the tipping bucket; and
a funnel housing pivotably coupled with the central housing, and comprising the funnel, wherein the funnel housing rotatably pivots relative to the central housing to pivot the funnel away from the tipping bucket and provide access to an interior of the sensor system including at least tipping bucket.

7. The system of claim 1, wherein the bucket holder is secured with the diaphragm such that the tipping bucket is separated from the diaphragm by a distance.

8. The system of claim 7, wherein the diaphragm comprises tab mountings; and
the bucket holder comprises at least a pair of flexible tabs each comprising a lateral ridge configured to engage the tab mountings and secure the bucket holder with the diaphragm.

9. The system of claim 8, wherein the diaphragm comprises mounting at least a pair of protrusions extending from the diaphragm and each protrusion comprising a recess forming the tab mountings and configured to receive at least a portion of a corresponding and aligned one of the lateral ridges of a corresponding one of the flexible tabs.

10. The system of claim 1, further comprising:
a central housing positioned about the tipping bucket, and comprising a first partial control board cavity separated by a first control board cavity wall from the tipping bucket; and
a base housing comprising a second partial control board cavity, wherein the base housing is configured to cooperated with the central housing cooperating the first partial control board cavity and the second partial control board cavity forming a control board cavity; and
a control board comprising the sensor control circuit, the trigger detector and power source couplers electrically coupled with at least the sensor control circuit and the trigger detector, wherein the control board is mounted within the control board cavity.

11. The system of claim 10, further comprising:
a removable power source holder comprising a holder base and a power source retaining slot extending from the holder base and configured to retain at least one removable power source, and wherein the holder base is configured to close the control board cavity while aligning the at least one removable power source with the power source couplers.

12. The system of claim 1, wherein the tipping rain bucket sensor further comprises a first wireless transceiver coupled with the sensor control circuit wherein the sensor control circuit is configured to cause the first wireless transceiver to wirelessly transmit the rain signals and the temperature sensor data, and the controller interface system comprises a second wireless transceiver communicatively coupled with the interface control circuit and configured to wirelessly receive the rain signals and the temperature sensor data.

* * * * *